US011537131B2

(12) United States Patent
Kobayashi et al.

(10) Patent No.: US 11,537,131 B2
(45) Date of Patent: Dec. 27, 2022

(54) CONTROL DEVICE, CONTROL METHOD, AND MOBILE BODY

(71) Applicant: SONY CORPORATION, Tokyo (JP)

(72) Inventors: Dai Kobayashi, Tokyo (JP); Takamori Yamaguchi, Tokyo (JP); Ryo Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 289 days.

(21) Appl. No.: 16/763,216

(22) PCT Filed: Nov. 6, 2018

(86) PCT No.: PCT/JP2018/041095
§ 371 (c)(1),
(2) Date: May 11, 2020

(87) PCT Pub. No.: WO2019/098082
PCT Pub. Date: May 23, 2019

(65) Prior Publication Data
US 2020/0333790 A1 Oct. 22, 2020

(30) Foreign Application Priority Data

Nov. 20, 2017 (JP) .............................. JP2017-222457

(51) Int. Cl.
*G05D 1/02* (2020.01)
*G01S 17/931* (2020.01)
(Continued)

(52) U.S. Cl.
CPC ........... *G05D 1/0214* (2013.01); *G01C 3/085* (2013.01); *G01S 17/89* (2013.01); *G01S 17/931* (2020.01);
(Continued)

(58) Field of Classification Search
None
See application file for complete search history.

(56) References Cited

U.S. PATENT DOCUMENTS 9,221,396 B1 * 12/2015 Zhu .......................... G01S 7/40
2015/0362921 A1  12/2015 Hanaoka et al.

FOREIGN PATENT DOCUMENTS

CN     105074600 A    11/2015
JP    2002-073770 A    3/2002
(Continued)

OTHER PUBLICATIONS

International Search Report and Written Opinion of PCT Application No. PCT/JP2018/041095, dated Jan. 29, 2019, 09 pages of ISRWO.

*Primary Examiner* — Hovhannes Baghdasaryan
(74) *Attorney, Agent, or Firm* — Chip Law Group

(57) ABSTRACT

The present disclosure relates to a control device, and a control method, a program, and a mobile body that enable efficient search for surrounding information when it is in an own position indefinite state. When it is in an own position indefinite state, on the basis of an own position, obstacle position information around oneself, and information of a surface sensing possible range of a surface sensing unit including a stereo camera for determining the own position, information of a surface-sensed area of an obstacle is recorded, and a search route is planned on the basis of the information of the surface-sensed area of the obstacle. The present technology can be applied to a multi-legged robot, a flying body, and an in-vehicle system that autonomously move according to a mounted computer.

18 Claims, 16 Drawing Sheets

(51) Int. Cl.
*G01C 3/08* (2006.01)
*G01S 17/89* (2020.01)
(52) U.S. Cl.
CPC ... G05D 1/0217 (2013.01); *G05D 2201/0213* (2013.01)

(56) References Cited

FOREIGN PATENT DOCUMENTS

| | | | |
|---|---|---|---|
| JP | 2003-092347 | A | 3/2003 |
| JP | 2004-133567 | A | 4/2004 |
| JP | 2010-217995 | A | 9/2010 |
| JP | 2011-170843 | A | 9/2011 |
| JP | 2014-194729 | A | 10/2014 |
| JP | 2016-095858 | A | 5/2016 |
| WO | 2014/132509 | A1 | 9/2014 |

* cited by examiner

CONTROL DEVICE, CONTROL METHOD, AND MOBILE BODY

CROSS REFERENCE TO RELATED APPLICATIONS

This application is a U.S. National Phase of International Patent Application No. PCT/JP2018/041095 filed on Nov. 6, 2018, which claims priority benefit of Japanese Patent Application No. JP 2017-222457 filed in the Japan Patent Office on Nov. 20, 2017. Each of the above-referenced applications is hereby incorporated herein by reference in its entirety.

TECHNICAL FIELD

The present disclosure relates to a control device, and a control method, a program, and a mobile body, and more particularly relates to a control device, and a control method, a program, and a mobile body capable of efficiently searching surroundings.

BACKGROUND ART

In order to achieve autonomous traveling of a mobile body such as a robot, it is necessary to recognize and estimate an own position thereof, which is a starting point for planning an action. Accordingly, a technology has been proposed to recognize a surrounding situation of itself by a device such as a sensor, estimate the own position, and plan autonomous traveling.

For example, in a case of sequentially estimating the own position using information of own positions continuously detected in the past, if traveling to an own position completely different from a previous own position occurs due to some external force, continuity with information of the own position in the past is lost, making the own position unrecognizable.

In such a case, in order to re-estimate the own position, the mobile body needs to search the surroundings while traveling around itself, sense the surroundings to obtain information, and estimate the own position from the obtained surrounding information.

At this time, if the mobile body travels around itself at random, it may repeatedly sense an area that has already been sensed, and it is possible that the surroundings cannot be searched efficiently.

Accordingly, it is conceivable to apply a technique to travel while covering the entire area by using a mapping module that indicates "unsearched", "traversed", "edge", and "occupied" (see Patent Document 1).

Furthermore, it is conceivable to apply a technique to store indoor structure data indicating a sensed travelable area in an already searched place, and to sequentially travel in a travelable direction (see Patent Document 2).

Moreover, it is conceivable to apply a technique to store an operation of searching for an obstacle or store a sensed area in order to obtain an area where the own apparatus can travel (see Patent Documents 3, 4).

CITATION LIST

Patent Document

Patent Document 1: Japanese Patent Application Laid-Open No. 2016-095858
Patent Document 2: Japanese Patent Application Laid-Open No. 2010-217995
Patent Document 3: Japanese Patent Application No. 2003-092347
Patent Document 4: Japanese Patent Application No. 2002-073770

SUMMARY OF THE INVENTION

Problems to be Solved by the Invention

However, by the technique of Patent Document 1, since it is a technique to travel while covering the entire area, the surroundings cannot be searched efficiently.

Furthermore, by the technique of Patent Document 2, a travelable area obtained from information at the time of search is stored, but cannot be used as information for efficiently searching the surroundings.

Moreover, by the techniques of Patent Documents 3, 4, an operation of searching for an obstacle or a sensed area is stored in order to obtain an area where the own apparatus can travel but the surface of the obstacle is neither sensed nor stored, and the surroundings cannot be efficiently searched according to the surface condition of the obstacle.

The present disclosure has been made in view of such situations, and has been made in particular to enable efficient search of surroundings.

Solutions to Problems

A control device according to an aspect of the present disclosure includes an own position estimation unit that estimates an own position, an obstacle position information generation unit that generates obstacle position information including a position of an obstacle in surroundings, a surface sensing unit that senses a surface of the obstacle, a surface-sensed area recording unit that records a surface-sensed area of the obstacle on the basis of the own position, the obstacle position information, and a surface sensing possible range of the surface sensing unit, and a route planning unit that plans a route on the basis of the surface-sensed area of the obstacle.

The surface-sensed area recording unit can record, as the surface-sensed area of the obstacle, a surface of the obstacle within the surface sensing possible range of the surface sensing unit as the surface-sensed area of the obstacle.

In the route planning unit, the route planning unit can include a priority setting unit that sets an incomplete area where surface sensing of the obstacle has not been completed, on the basis of the surface-sensed area of the obstacle and the obstacle position information, sets a divided area obtained by dividing the incomplete area as waypoints, and sets priorities to the waypoints. The route via the waypoints can be planned on the basis of the priorities set by the priority setting unit.

The priority setting unit can set the priorities of the waypoints according to an order of passing through the waypoints in a route on which a priority cost, which is a cost set on the basis of the priority condition, is the lowest among routes passing through all the waypoints.

The priority condition can be a total traveling distance or a total power consumption, and the priority cost can be a cost that is set according to a traveling distance or a cost set according to a power consumption.

The priority setting unit can set the priorities of the waypoints according to an order of passing through the waypoints in a route on which a priority cost, which is a cost set on the basis of the priority condition and body movement information, is the lowest among routes passing through all the waypoints.

The body movement information can be information of a maximum speed, a minimum turning radius, and a height of a crossable step on a path in a case where the priority condition is a total traveling distance, or information of a power consumption per unit distance and a charge capacity of a battery in a case where the priority condition is a total power consumption.

The route planning unit can plan the route that passes through all the waypoints on the basis of the priorities that are respectively set to the waypoints by the priority setting unit and of a traveling condition.

The route planning unit can calculate, for all routes that pass through all the waypoints, a route cost that is set on the basis of the priorities that are respectively set to the waypoints by the priority setting unit and of a traveling condition, and select a route on which the route cost is lowest.

The traveling condition can include a condition that the waypoints are passed through in descending order of priorities, a condition that traveling is performed in a shortest time even by ignoring the priorities of the waypoints, or a condition that a waypoint with a higher priority is reached earlier.

In a case where the traveling condition is the condition that a waypoint with a higher priority is reached earlier, the route planning unit can set a product of the priority and a time for reaching the waypoint as the route cost, and select a route on which the route cost is lowest among all the routes.

The own position estimation unit can include a time-series information own position estimation unit that estimates the own position by using time-series information including sensor information supplied in time series and outputs an estimation result as time-series information own position, and the surface-sensed area recording unit can record the surface-sensed area of the obstacle on the basis of the time-series information own position, the obstacle position information, and the surface sensing possible range of the surface sensing unit.

The time-series information can be three-dimensional point cloud information detected by light detection and ranging, laser imaging detection and ranging (LIDAR), and position information, posture, velocity, acceleration, and angular velocity detected by a wheel encoder, and the obstacle position information generation unit can generate, on the basis of the three-dimensional point cloud information, obstacle position information including a relative position and a direction of the obstacle in the surroundings.

The own position estimation unit can further include a current information own position estimation unit that estimates the own position, on the basis of current information including sensor information that outputs a current sensing result, and outputs an estimation result as a current information own position.

The current information can be a parallax image imaged by the surface sensing unit including a stereo camera, the current information own position estimation unit can generate a depth image on the basis of a parallax image that is the current information, extract an image feature amount from the depth image, estimate the own position on the basis of a position associated with the image feature amount, and output an estimation result as the current information own position, and the own position estimation unit can integrate the time-series information own position and the current information own position and output an integrated position as the own position.

A position image feature amount storage unit in which the position and the image feature amount are stored in association with each other can be further included, in which when integrating the time-series information own position and the current information own position and outputting an integrated position as the own position, the own position estimation unit stores the image feature amount corresponding to the current information own position and the own position in association with each other in the position image feature amount storage unit.

In a case where the own position is in an indefinite state, the surface-sensed area recording unit can record the surface-sensed area of the obstacle, on the basis of the own position, the obstacle position information, and the surface sensing possible range of the surface sensing unit.

A control method according to an aspect of the present disclosure includes an own position estimation process that estimates an own position, an obstacle position information generation process that generates obstacle position information including a position of an obstacle in surroundings, a surface sensing process that senses a surface of the obstacle, a surface-sensed area recording process that records a surface-sensed area of the obstacle on the basis of the own position, the obstacle position information, and a surface sensing possible range of the surface sensing process, and a route planning process that plans a route on the basis of the surface-sensed area of the obstacle.

A program according to an aspect of the present disclosure includes an own position estimation unit that estimates an own position, an obstacle position information generation unit that generates obstacle position information including a position of an obstacle in surroundings, a surface sensing unit that senses a surface of the obstacle, a surface-sensed area recording unit that records a surface-sensed area of the obstacle on the basis of the own position, the obstacle position information, and a surface sensing possible range of the surface sensing unit, and a route planning unit that plans a route on the basis of the surface-sensed area of the obstacle.

A mobile body according to an aspect of the present disclosure includes an own position estimation unit that estimates an own position, an obstacle position information generation unit that generates obstacle position information including a position of an obstacle in surroundings, a surface sensing unit that senses a surface of the obstacle, a surface-sensed area recording unit that records a surface-sensed area of the obstacle on the basis of the own position, the obstacle position information, and a surface sensing possible range of the surface sensing unit, a planning unit that plans a route on the basis of the surface-sensed area of the obstacle, an action plan generation unit that generates an action plan on the basis of the route planned by the planning unit, and a control unit that controls an operation of the mobile body on the basis of the action plan determined by the action plan generation unit.

In an aspect of the present disclosure, an own position is estimated, an obstacle position information including a position of an obstacle in surroundings is generated, a surface of the obstacle is sensed, a surface-sensed area of the obstacle is recorded on the basis of the own position, the obstacle position information, and the surface sensing possible range, and a route is planned on the basis of the surface-sensed area of the obstacle.

Effects of the Invention

According to an aspect of the present disclosure, it is particularly possible to efficiently search surroundings.

MODE FOR CARRYING OUT THE INVENTION

Hereinafter, preferred embodiments of the present disclosure will be described in detail with reference to the accompanying drawings. Note that in the present description and drawings, components which have substantially the same function configurations are given the same reference signs, thereby omitting duplicated descriptions.

Hereinafter, embodiments for carrying out the present technology will be described. The description will be made in the following order.

1. Overview of present disclosure
2. Preferred embodiment
3. Modification example
4. Example of execution by software 1. Overview of Present Disclosure A mobile body of the present disclosure is a mobile body that performs sensing while searching surroundings to obtain surrounding information if an own position becomes indefinite, thereby making it possible to efficiently search the surroundings upon estimating a new own position.

Figure 1:
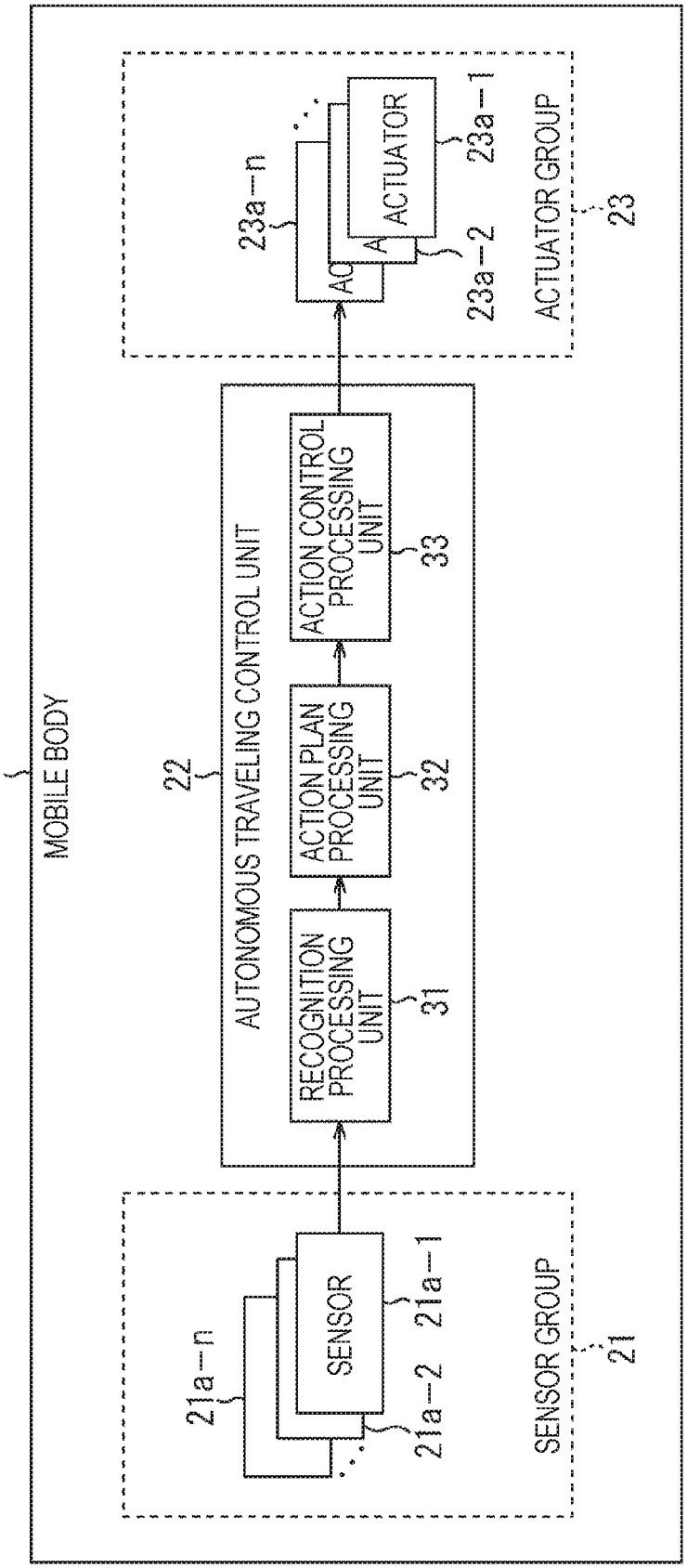
FIG. 1 is a diagram illustrating a configuration example of a mobile body describing an outline of the present disclosure.

FIG. 1 illustrates a configuration example that is an outline of a mobile body 11 of the present disclosure.

The mobile body 11 is, for example, a robot or the like, and includes a sensor group 21, an autonomous traveling control unit 22, and an actuator group 23.

The sensor group 21 includes sensors 21a-1 to 21a-n that detect various kinds of information necessary for recognizing situations inside the mobile body 11 and of the surroundings of the mobile body 11, and outputs a detection result to the autonomous traveling control unit 22. Furthermore, when it is not necessary to particularly distinguish the sensors 21a-1 to 21a-n, the sensors 21a-1 to 21a-n are simply referred to as sensors 21a, and other components are also referred similarly.

More specifically, the sensors 21a-1 to 21a-n include, for example, a camera that images the surroundings of the mobile body 11, an acceleration sensor that detects a movement of the mobile body 11, a LIDAR that measures the distance to an object existing around the mobile body 11, a time-of-flight (ToF) sensor, a geomagnetic sensor that detects a direction, a gyro sensor, a barometric sensor that detects a change in ambient pressure, a contact sensor that detects presence or absence of contact or the like, a temperature sensor that detects a temperature, a humidity sensor that detects humidity, a position sensitive detector (PSD) ranging sensor, a global navigation satellite system (GNSS) that detects a position on the earth, and the like.

The autonomous traveling control unit 22 recognizes a surrounding situation from various detection results of the sensor group 21, generates an action plan on the basis of a recognition result, and operates various types of actuators 23a-1 to 23a-n of the actuator group 23 that drive the robot according to the action plan. Furthermore, when it is not necessary to particularly distinguish the actuators 23a-1 to 23a-n, the actuators 23a-1 to 23a-n are simply referred to as actuators 23a, and other components are also referred similarly.

More specifically, the autonomous traveling control unit 22 includes a recognition processing unit 31, an action plan processing unit 32, and an action control processing unit 33.

The recognition processing unit 31 executes a recognition process on the basis of a detection result supplied from the sensor group 21 to recognize, for example, an image, a person, an object, a type of expression, a position, an attribute, and a position of itself or an obstacle, and the like, and outputs a result to the action plan processing unit 32 as a recognition result. Further, the recognition processing unit 31 estimates an own position on the basis of a detection result including time-series information supplied from the sensor group 21. Furthermore, for example, in a case where the mobile body 11 is a mobile toy or the like, the recognition processing unit 31 switches an operation mode to a search mode when it is brought to a state that the own position cannot be estimated on the basis of a detection result supplied by the sensor group 21, such as being held up by a user. In the search mode, the recognition processing unit 31 searches the surroundings to allow efficient sensing of the surroundings, and re-estimates the own position from sensing results of the surroundings. At this time, the recognition processing unit 31 stores a surrounding sensed area on the basis of information detected by the search, and outputs the information of the sensed area to the action plan processing unit 32 so that an unsensed area can be efficiently sensed.

The action plan processing unit 32 generates, on the basis of the recognition result, an action plan of a trace of traveling, a state change, and a speed or acceleration, and the like of a device related to traveling of the mobile body 11, which are actions of the whole of the mobile body 11, and supplies the action plan to the action control processing unit 33. Furthermore, in the search mode, the action plan processing unit 32 plans a route that allows efficient sensing of surroundings on the basis of information of the sensed area, and generates an action plan corresponding to the planned route.

The action control processing unit 33 generates a control signal for controlling a specific movement of each of the actuators 23a-1 to 23a-n of the actuator group 23 on the basis of the action plan supplied from the action plan processing unit 32, so as to operate the actuator group 23.

The actuator group 23 operates the actuators 23a-1 to 23a-n that specifically operate the mobile body 11 on the basis of the control signal supplied from the action control processing unit 33. More specifically, the actuators 23a-1 to 23a-n actuate operations of a motor, a servomotor, a brake, and the like for implementing a specific movement of the mobile body 11 on the basis of the control signal.

Furthermore, the actuators 23a-1 to 23a-n include components for implementing an expansion or contraction motion, a bending or stretching motion, a turning motion, or the like, and include components such as a display unit including a light emission diode (LED), a liquid crystal display (LCD), or the like for displaying information, and a speaker that outputs sound. Therefore, by controlling the actuator group 23 on the basis of the control signal, various operations of devices that drive the mobile body 11 are implemented, and information is displayed and sound is output.

That is, by controlling the actuators 23a-1 to 23a-n of the actuator group 23, operation related to traveling of the mobile body 11 is controlled, and presentation of various kinds of information such as display of information and output of sound is also controlled.

<Overview of Search Mode of Present Disclosure>

The mobile body 11 switches the operation mode from the normal mode to the search mode if the own position becomes indefinite for some reason on the basis of a sensing result of the sensor group 21.

In the search mode, the mobile body 11 travels while searching the surroundings, and the sensor group 21 senses the surface of an obstacle in the surroundings.

Here, the recognition processing unit 31 records an area that is surface-sensed by the sensor group 21 as a database.

Figure 2:
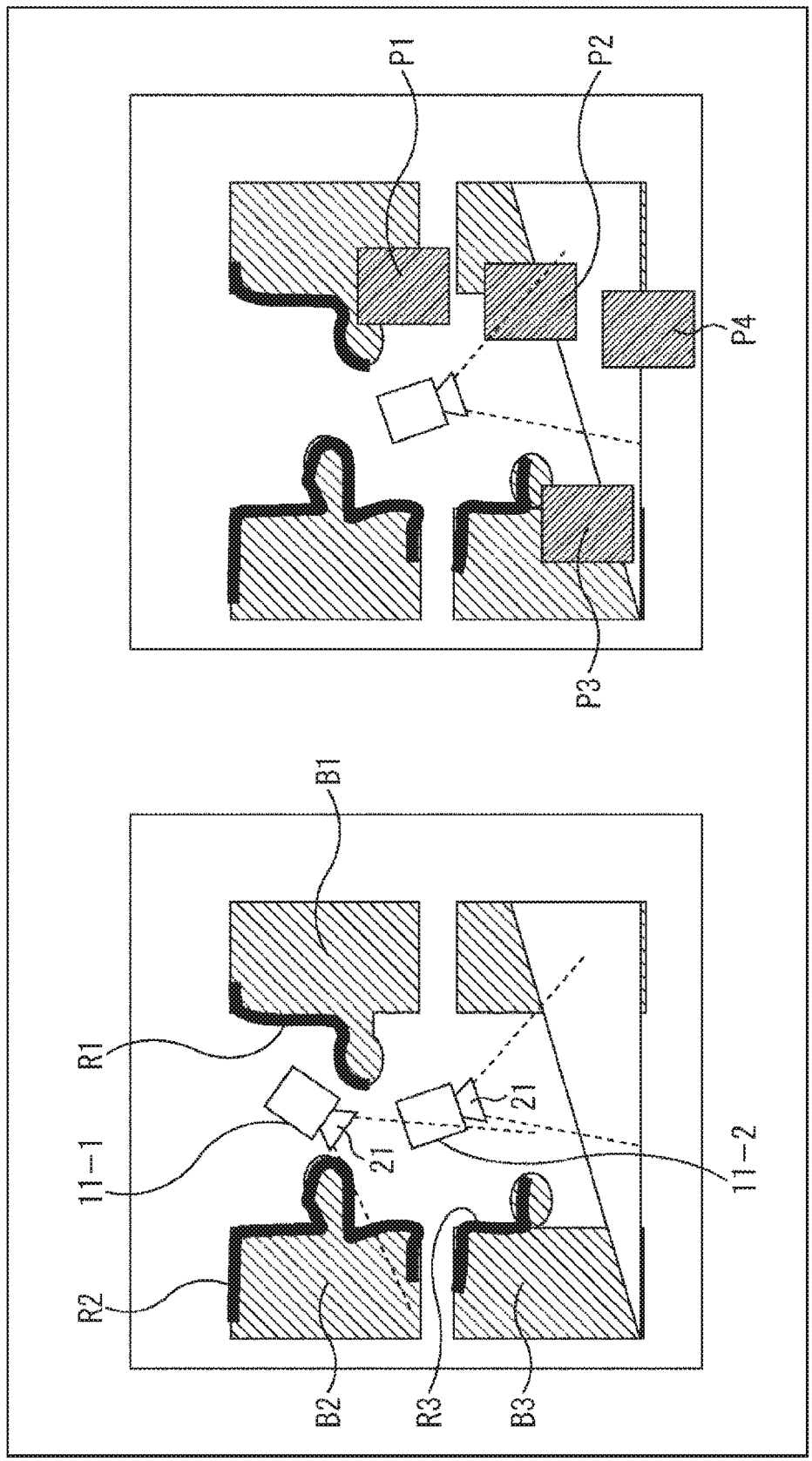
FIG. 2 is a diagram describing the outline of the present disclosure.

That is, for example, as illustrated in a left part of FIG. 2, when traveling is performed from a mobile body 11-1 to a mobile body 11-2 between obstacles B1 to B3, the sensor group 21 senses surfaces of the obstacles B1 to B3, and the recognition processing unit 31 records the sensed area, for example, as indicated by sensed surface areas R1 to R3.

The action plan processing unit 32 plans a route and generates an action plan so that an area that has not been sensed can be efficiently sensed on the basis of information of the sensed surface areas R1 to R3 recorded as illustrated in the left part of FIG. 2.

More specifically, as illustrated in a right part of FIG. 2, the action plan processing unit 32 divides an area that has not been sensed into a plurality of areas, sets the areas as, for example, waypoints P1 to P4, and sets priorities of the waypoints P1 to P4.

Then, the action plan processing unit 32 plans a plurality of routes that passes through each of the waypoints P1 to P4, determines a route on the basis of priorities, areas that can be sensed by the sensor group 21 of the mobile body 11 and conditions related to traveling, and generates an action plan based on the determined route.

As a result, even when the own position becomes indefinite, it is possible to quickly obtain the own position by sensing while efficiently searching the surroundings and efficiently obtaining surrounding information, and it is possible to achieve an early resumption of the operation in the normal mode.

2. Preferred Embodiment

<Configuration Example of Mobile Body Control System that Controls Mobile Body of Present Disclosure>

A mobile body control system that controls the mobile body 11 for implementing the above-described functions will be described.

Figure 3:
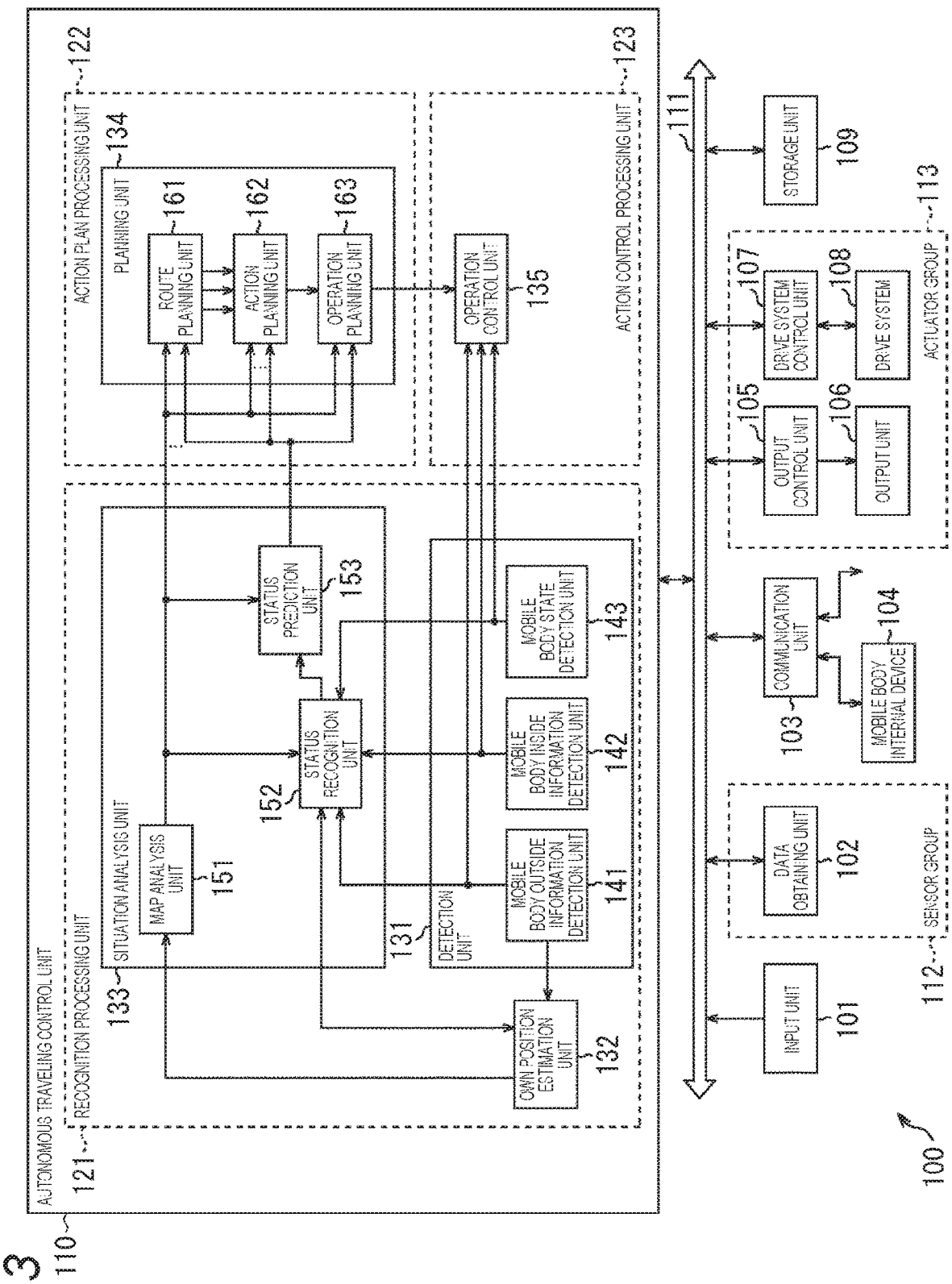
FIG. 3 is a block diagram describing a configuration example of a mobile body control system that controls a mobile body according to the present disclosure.

FIG. 3 is a block diagram illustrating a configuration example of a schematic function of a mobile body control system 100 that controls the mobile body 11 according to the present disclosure. Note that although the mobile body control system 100 in FIG. 3 is an example of a mobile body control system that controls the mobile body 11 including a robot to which the present technology can be applied, the mobile body control system 100 can also be applied as a system that controls other mobile bodies, for example, an aircraft, a ship, a multi-rotor copter (drone), and the like. Furthermore, the robot may be a wheel-type robot, an autonomous driving vehicle that is rideable, or a multi-legged walking robot.

The mobile body control system 100 includes an input unit 101, a data obtaining unit 102, a communication unit 103, a mobile body internal device 104, an output control unit 105, an output unit 106, a drive system control unit 107, a drive system 108, a storage unit 109, and an autonomous traveling control unit 110. The input unit 101, the data obtaining unit 102, the communication unit 103, the output control unit 105, the drive system control unit 107, the storage unit 109, and the autonomous traveling control unit 110 are mutually connected via a communication network 111. The communication network 111 is, for example, a local area network (LAN) such as a controller area network (CAN), a local interconnect network (LIN), or IEEE802.3, or a communication network or a bus conforming to an arbitrary standard such as FlexRay (registered trademark), or a unique communication method that is not standardized, or the like. Note that respective units of the mobile body control system 100 can also be directly connected without passing through the communication network 111.

Note that hereinafter, when each unit of the mobile body control system 100 communicates via the communication network 111, description of the communication network 111 is omitted. For example, when the input unit 101 and the autonomous traveling control unit 110 communicate via the communication network 111, it is described that the input unit 101 and the autonomous traveling control unit 110 simply communicate.

The input unit 101 includes a device used by a passenger for inputting various data, instructions, and the like. For example, the input unit 101 includes operating devices such as a touch panel, a button, a microphone, a switch, and a lever, and an operating device or the like that allows input by a method other than manual operation using voice, a gesture, or the like. Furthermore, for example, the input unit 101 may be a remote control device using infrared rays or other radio waves, or an externally connected device such as a mobile device or a wearable device or the like corresponding to operation of the mobile body control system 100. The input unit 101 generates an input signal on the basis of data, instructions, and the like input by a passenger, and supplies the input signal to each unit of the mobile body control system 100.

The data obtaining unit 102 includes various sensors and the like for obtaining data used for processing of the mobile body control system 100, and supplies the obtained data to each unit of the mobile body control system 100.

For example, the data obtaining unit 102 constitutes the sensor group 112 by including various sensors for detecting a state of the mobile body, and the like, and corresponds to the sensor group 21 including the sensors 21*a*-1 to 21*a-n* in FIG. 1. Specifically, for example, the data obtaining unit 102 includes a gyro sensor, an acceleration sensor, an inertial measurement device (IMU), and sensors for detecting an operating amount of an acceleration input of an accelerator or the like, an operating amount of a deceleration input, an operating amount of a direction instruction input, the number of rotations, input-output energy, or fuel amount of a drive apparatus such as an engine or a motor, the amount of torque of an engine, motor, or the like, or the rotation speed or torque of a wheel or joint, and the like.

Furthermore, for example, the data obtaining unit 102 includes various sensors for detecting outside information of the mobile body. Specifically, for example, the data obtaining unit 102 includes an imaging device such as a time-of-flight (ToF) camera, a stereo camera, a monocular camera, an infrared camera, a polarization camera, and other cameras. Furthermore, for example, the data obtaining unit 102 includes an environment sensor for weather or meteorological detection, and a surrounding information detection sensor for detecting an object around the mobile body. The environmental sensor includes, for example, a raindrop sensor, a fog sensor, a sunshine sensor, a snow sensor, and the like. The surrounding information detection sensor includes, for example, a laser ranging sensor, an ultrasonic sensor, a radar, a LiDAR (Light Detection and Ranging, Laser Imaging Detection and Ranging), a sonar, and the like.

Moreover, for example, the data obtaining unit 102 includes various sensors for detecting the current position of the mobile body. Specifically, for example, the data obtaining unit 102 includes a GNSS receiver that receives a GNSS signal from a global navigation satellite system (GNSS) satellite, or the like.

The communication unit 103 communicates with the mobile body internal device 104 and various devices, servers, base stations, and the like outside the mobile body, and transmits data supplied from each unit of the mobile body control system 100, and supplies received data to each unit of the mobile body control system 100. Note that a communication protocol supported by the communication unit 103 is not particularly limited, and furthermore, the communication unit 103 can support a plurality of types of communication protocols.

For example, the communication unit 103 performs wireless communication with the mobile body internal device 104 by wireless LAN, Bluetooth (registered trademark), near field communication (NFC), or wireless USB (WUSB), or the like. Furthermore, for example, the communication unit 103 performs wired communication with the mobile body internal device 104 by a universal serial bus (USB), a High-Definition Multimedia Interface (HDMI) (registered trademark), or a mobile high-definition link (MHL), or the like via a connection terminal (and a cable as necessary) that is not illustrated.

Moreover, for example, the communication unit 103 communicates with a device (for example, an application server or a control server) existing on an external network (for example, the Internet, a cloud network, or an operator-specific network) via a base station or an access point. Furthermore, for example, the communication unit 103 performs communication with a terminal (for example, a pedestrian or a store terminal, or a machine type communication (MTC) terminal) existing near the mobile body, using a peer-to-peer (P2P) technique. Moreover, for example, in a case where the mobile body 11 is a vehicle, the communication unit 103 performs V2X communication such as vehicle-to-vehicle communication, road-to-vehicle (vehicle-to-infrastructure) communication, communication between a mobile body and a home (vehicle-to-home), and vehicle-to-pedestrian communication. Furthermore, for example, the communication unit 103 includes a beacon receiving unit to receive radio waves or electromagnetic waves transmitted from wireless stations and the like installed on the road, and obtain information such as the current position, traffic jam, traffic regulation, or required time.

The mobile body internal device 104 includes, for example, a mobile device or a wearable device possessed by a passenger, an information device carried or attached to the mobile body, a navigation device that performs a search for a route to an arbitrary destination, and the like.

The output control unit 105 controls output of various kinds of information to a passenger of the mobile body or to outside of the mobile body. For example, the output control unit 105 generates an output signal including at least one of visual information (for example, image data) or auditory information (for example, sound data), and supplies the output signal to the output unit 106, thereby controlling output of visual information and auditory information from the output unit 106. Specifically, for example, the output control unit 105 generates an overhead image or a panoramic image or the like by combining image data imaged by different imaging devices of the data obtaining unit 102, and supplies an output signal including the generated image to the output unit 106. Furthermore, for example, the output control unit 105 generates sound data including a warning sound or a warning message or the like for danger such as collision, contact, or entry into a danger zone, and supplies an output signal including the generated sound data to the output unit 106.

The output unit 106 includes a device capable of outputting visual information or auditory information to a passenger of the mobile body or to outside of the mobile body. For example, the output unit 106 includes a display device, an instrument panel, an audio speaker, a headphone, a wearable device such as a glasses-type display worn by a passenger, a projector, a lamp, and the like. The display device included in the output unit 106 may be, besides a device having a normal display, a display device that displays visual information in a visual field of a driver, for example, a head-up display, a transmission type display, a device having an augmented reality (AR) display function, or the like. Note that the output control unit 105 and the output unit 106 are not necessary components for processing of autonomous traveling, and may be omitted as necessary.

The drive system control unit 107 controls the drive system 108 by generating various control signals and supplying them to the drive system 108. Furthermore, the drive system control unit 107 supplies a control signal to each unit other than the drive system 108 as necessary, and performs notification of a control state of the drive system 108, and the like.

The drive system 108 includes various devices related to the drive system of the mobile body. For example, the drive system 108 includes a servomotor provided at each joint of four legs and capable of designating an angle and torque, a motion controller that disassembles a motion of the robot itself into motions of four legs and replaces with them, and a feedback control device with a sensor in each motor or a sensor on the sole of a foot.

In another example, the drive system 108 includes a motor having four to six upward propellers on the body, and a motion controller that disassembles a motion of traveling of the robot itself into the amounts of rotation of respective motors and replaces with them.

Moreover, in another example, the drive system 108 includes a driving force generating apparatus for generating driving force, such as an internal combustion engine or a drive motor, a driving force transmission mechanism for transmitting driving force to wheels, a steering mechanism that adjusts a steering angle, a braking device that generates a braking force, an antilock braking system (ABS), an electronic stability control (ESC), and an electric power steering device, and the like. Note that the output control unit 105, the output unit 106, the drive system control unit 107, and the drive system 108 constitute an actuator group 113, and correspond to the actuator group 23 including the actuators 23a-1 to 23a-n in FIG. 1.

The storage unit 109 includes, for example, a magnetic storage device such as a read only memory (ROM), a random access memory (RAM), and a hard disc drive (HDD), a semiconductor storage device, an optical storage device, a magneto-optical storage device, and the like. The storage unit 109 stores various programs, data, and the like used by respective units of the mobile body control system 100. For example, the storage unit 109 stores map data of a three-dimensional high-accuracy map such as a dynamic map, a global map that is less accurate than the high-accuracy map and covers a wide area, and a local map that includes surrounding information of a mobile body, and the like.

The autonomous traveling control unit 110 performs control related to autonomous traveling, such as autonomous driving or driving assistance. Specifically, for example, the autonomous traveling control unit 110 performs cooperative control aiming at implementing a function of avoiding collision or mitigating impact of the mobile body, following traveling on the basis of a distance between mobile bodies, speed-maintained traveling of the mobile body, or a warning of collision of the mobile body. Furthermore, for example, the autonomous traveling control unit 110 performs cooperative control aiming at autonomous traveling or the like to autonomously travel without depending on operation by an operator or user. The autonomous traveling control unit 110 includes a detection unit 131, an own position estimation unit 132, a situation analysis unit 133, a planning unit 134, and an operation control unit 135. Among them, the detection unit 131, the own position estimation unit 132, and the situation analysis unit 133 constitute a recognition processing unit 121, and correspond to the recognition processing unit 31 in FIG. 1. Furthermore, the planning unit 134 constitutes an action plan processing unit 122, and corresponds to the action plan processing unit 32 in FIG. 1. Moreover, the operation control unit 135 constitutes the action control processing unit 123 and corresponds to the action control processing unit 33 in FIG. 1.

The detection unit 131 detects various kinds of information necessary for controlling autonomous traveling. The detection unit 131 includes a mobile body outside information detection unit 141, a mobile body inside information detection unit 142, and a mobile body state detection unit 143.

The mobile body outside information detection unit 141 performs a detection process of outside information of the mobile body on the basis of data or signals from each unit of the mobile body control system 100. For example, the mobile body outside information detection unit 141 performs a detection process, a recognition process, and a tracking process of an object around the mobile body, and a detection process of the distance to the object. Objects as detection targets include, for example, mobile bodies, people, obstacles, structures, roads, traffic lights, traffic signs, road markings, and the like. Furthermore, for example, the mobile body outside information detection unit 141 performs a detection process of a surrounding environment of the mobile body. The surrounding environment as a detection target includes, for example, weather, temperature, humidity, brightness, and road surface conditions, and the like. The mobile body outside information detection unit 141 supplies data indicating a result of the detection process to the own position estimation unit 132, a map analysis unit 151 and a situation recognition unit 152 of the situation analysis unit 133, and the operation control unit 135, and the like.

The mobile body inside information detection unit 142 performs a detection process of information inside the mobile body on the basis of data or signals from each unit of the mobile body control system 100. For example, the mobile body inside information detection unit 142 performs an authentication process and a recognition process of a driver, a driver state detection process, a passenger detection process, and an environment detection process inside the mobile body, and the like. The state of the driver as a detection target includes, for example, physical condition, awakening level, concentration level, fatigue level, line-of-sight direction, and the like. The environment inside the mobile body as a detection target includes, for example, temperature, humidity, brightness, odor, and the like. The mobile body inside information detection unit 142 supplies data indicating a result of a detection process to the situation recognition unit 152 of the situation analysis unit 133, the operation control unit 135, and the like.

The mobile body state detection unit 143 performs a detection process of the state of the mobile body on the basis of data or signals from each unit of the mobile body control system 100. The state of the mobile body as a detection target includes, for example, speed, acceleration, steering angle, presence or absence and content of abnormality, driving operation state, position and inclination of power seat, door lock state, and states of other devices mounted on the mobile body, and the like. The mobile body state detection unit 143 supplies data indicating a result of the detection process to the situation recognition unit 152 of the situation analysis unit 133, the operation control unit 135, and the like.

The own position estimation unit 132 performs an estimation process of a position and posture and the like of the mobile body on the basis of data or a signal from each unit of the mobile body control system 100, such as the mobile body outside information detection unit 141 and the situation recognition unit 152 of the situation analysis unit 133. Furthermore, the own position estimation unit 132 generates a local map (hereinafter referred to as an own position estimation map) used for own position estimation as necessary. The own position estimation map is, for example, a highly accurate map using a technique such as simultaneous localization and mapping (SLAM). The own position estimation unit 132 supplies data indicating a result of the estimation process to the map analysis unit 151 and the situation recognition unit 152 of the situation analysis unit 133, and the like. Furthermore, the own position estimation unit 132 causes the storage unit 109 to store the own position estimation map.

Moreover, the own position estimation unit 132 accumulates time-series information supplied in time series from, for example, a LIDAR or a wheel encoder on the basis of a detection result supplied from the sensor group 112 on a database, and estimates an own position on the basis of the time-series information and outputs the own position as a time-series information own position. Furthermore, the own position estimation unit 132 estimates an own position on the basis of, for example, a current detection result supplied from the sensor group 112, such as a depth image obtained on the basis of a parallax image imaged by a stereo camera, and outputs the own position as current information own position. Moreover, the own position estimation unit 132 integrates the time-series information own position and the current information own position using, for example, a Kalman filter, a particle filter, or the like, and outputs the result as an own position estimation result. Note that the time-series information own position and the current information own position output here both include the own position and information of the direction of the mobile body 11 obtained when the own position is estimated. Therefore, hereinafter, when referring to as the time-series information own position, and the current information own position, and simply the own position, it is assumed that they include information of the direction of the mobile body 11 together when the own position is estimated.

The situation analysis unit 133 performs an analysis process of the situation of the mobile body and surroundings. Furthermore, the situation analysis unit 133 switches the operation mode from the normal mode to the search mode on the basis of whether or not it is in an own position indefinite state, and causes the action plan processing unit 122 to execute an action plan process in the search mode to plan actions so as to efficiently search for surrounding information. The situation analysis unit 133 includes the map analysis unit 151, the situation recognition unit 152, and a situation prediction unit 153.

The map analysis unit 151 performs an analysis process of various maps stored in the storage unit 109 while using data or signals from each unit of the mobile body control system 100 such as the own position estimation unit 132 and the mobile body outside information detection unit 141 as necessary, so as to construct a map including information necessary for processing of autonomous traveling. The map analysis unit 151 supplies the constructed map to the situation recognition unit 152 and the situation prediction unit 153, as well as a route planning unit 161, an action planning unit 162, and an operation planning unit 163 of the planning unit 134, and the like.

The situation recognition unit 152 performs a process of recognizing a situation related to the mobile body on the basis of data or signals from each unit of the mobile body control system 100, such as the own position estimation unit 132, the mobile body outside information detection unit 141, the mobile body inside information detection unit 142, the mobile body state detection unit 143, and the map analysis unit 151. For example, the situation recognition unit 152 performs a recognition process of the situation of the mobile body, the situation around the mobile body, the situation of a driver of the mobile body, and the like. Furthermore, the situation recognition unit 152 generates a local map (hereinafter referred to as a situation recognition map) used for recognizing a surrounding situation of the mobile body as necessary. The situation recognition map is, for example, an occupancy grid map, a road map (lane map), or a point cloud map.

The situation of the mobile body as a recognition target includes, for example, position, posture, motion (for example, speed, acceleration, traveling direction, and the like) of the mobile body, and presence or absence, content of an abnormality, and the like. The surrounding situation of the mobile body as a recognition target includes, for example, a type and position of a stationary object in the surroundings, a type, position, and traveling of a moving object in the surroundings (for example, speed, acceleration, traveling direction, and the like), a configuration of a surrounding road and the state of a road surface, and weather, temperature, humidity, brightness, and the like of the surroundings. The state of the driver as a recognition target includes, for example, physical condition, awakening level, concentration level, fatigue level, line-of-sight movement, and driving operation, and the like.

The situation recognition unit 152 supplies data indicating a result of the recognition process (including a situation recognition map as necessary) to the own position estimation unit 132, the situation prediction unit 153, and the like. Further, the situation recognition unit 152 causes the storage unit 109 to store the situation recognition map. Furthermore, the situation recognition unit 152 determines whether or not it is in the own position indefinite state on the basis of, for example, whether or not it is in a state immediately after power is turned on, or it is held up or the like. Here, if it is in the own position indefinite state, the situation recognition unit 152 switches the operation mode to the search mode. When the operation mode is switched to the search mode, the situation recognition unit 152 causes the action plan processing unit 122 to execute the action plan process in the search mode to plan actions so as to efficiently search for surrounding information. More specifically, the situation recognition unit 152 generates information of a sensed area on the basis of information supplied by the sensor group 112 and, if it becomes the search mode, outputs the information of the sensed area to the action plan processing unit 122 so that actions are planned so as to efficiently search an unsensed area in the surroundings.

The situation prediction unit 153 performs a situation prediction process with respect to the mobile body on the basis of data or signals from each unit of the mobile body control system 100, such as the map analysis unit 151 and the situation recognition unit 152. For example, the situation prediction unit 153 performs a prediction process of the situation of the mobile body, the situation around the mobile body, and the situation of the driver, and the like.

The situation of the mobile body as a prediction target includes, for example, a behavior of the mobile body, occurrence of abnormality, and a travelable distance, and the like. The situation around the mobile body as a prediction target includes, for example, a behavior of the moving object around the mobile body, a change in a signal state, and a change in the environment such as weather, and the like. The situation of the driver as a prediction target includes, for example, a behavior and physical condition and the like of the driver.

The situation prediction unit 153 supplies data indicating a result of the prediction process, together with data from the situation recognition unit 152, to the route planning unit 161, the action planning unit 162, and the operation planning unit 163 of the planning unit 134, and the like.

The route planning unit 161 plans a route to a destination on the basis of data or signals from each unit of the mobile body control system 100, such as the map analysis unit 151 and the situation prediction unit 153. For example, the route planning unit 161 sets a route from the current position to a designated destination on the basis of the global map. Furthermore, for example, the route planning unit 161 changes the route as appropriate on the basis of situations of traffic jam, accident, traffic restriction, construction, and the like and physical condition of the driver, and the like. The route planning unit 161 supplies data indicating a planned route to the action planning unit 162 and the like.

The action planning unit 162 plans actions of the mobile body so as to safely travel on the route planned by the route planning unit 161 within a planned time on the basis of data or signals from each unit of the mobile body control system 100, such as the map analysis unit 151 and the situation prediction unit 153. For example, the action planning unit 162 performs planning of start, stop, traveling direction (for example, forward, backward, left turn, right turn, direction change, and the like), traveling speed, and overtaking, and the like. The action planning unit 162 supplies data indicating planned actions of the mobile body to the operation planning unit 163 and the like.

More specifically, the action planning unit 162 generates, as an action plan candidate, a candidate of action plan of the mobile body for safely traveling within a planned time for each of routes each planned by the route planning unit 161. More specifically, the action planning unit 162 generates the action plan candidate by, for example, an A* algorithm (A-star search algorithm) that divides an environment into a grid and optimizes arrival determination and the weight of a path to generate a best path, a lane algorithm that sets a path according to a road center line, and a rapidly-exploring random tree (RRT) algorithm that extends a path from its own position to a location that can be reached incrementally while appropriately pruning it, or the like.

The operation planning unit 163 plans operations of the mobile body so as to implement the action planned by the action planning unit 162 on the basis of data or signals from each unit of the mobile body control system 100, such as the map analysis unit 151 and the situation prediction unit 153. For example, the operation planning unit 163 plans an acceleration, a deceleration, and a traveling track, and the like. The operation planning unit 163 supplies data indicating the planned operations of the mobile body to the operation control unit 135 and the like.

The operation control unit 135 controls operations of the mobile body.

More specifically, on the basis of detection results of the mobile body outside information detection unit 141, the mobile body inside information detection unit 142, and the mobile body state detection unit 143, the operation control unit 135 performs a detection process of emergency situations such as collision, contact, entry into a danger zone, abnormality of the driver, and abnormality of the mobile body. When occurrence of an emergency situation is detected, the operation control unit 135 plans an operation of the mobile body to avoid the emergency situation, such as a sudden stop or an abrupt turn.

Furthermore, the operation control unit 135 performs acceleration-deceleration control for implementing the operation of the mobile body planned by the operation planning unit 163. For example, the operation control unit 135 calculates a control target value of the driving force generating apparatus or the braking device for implementing the planned acceleration, deceleration, or sudden stop, and supplies a control command indicating the calculated control target value to the drive system control unit 107.

The operation control unit 135 performs direction control for implementing the operation of the mobile body planned by the operation planning unit 163. For example, the operation control unit 135 calculates a control target value of the steering mechanism for implementing a traveling track or an abrupt turn planned by the operation planning unit 163, and supplies a control command indicating the calculated control target value to the drive system control unit 107.

<Detailed Configuration Example of Recognition Processing Unit>

Figure 4:
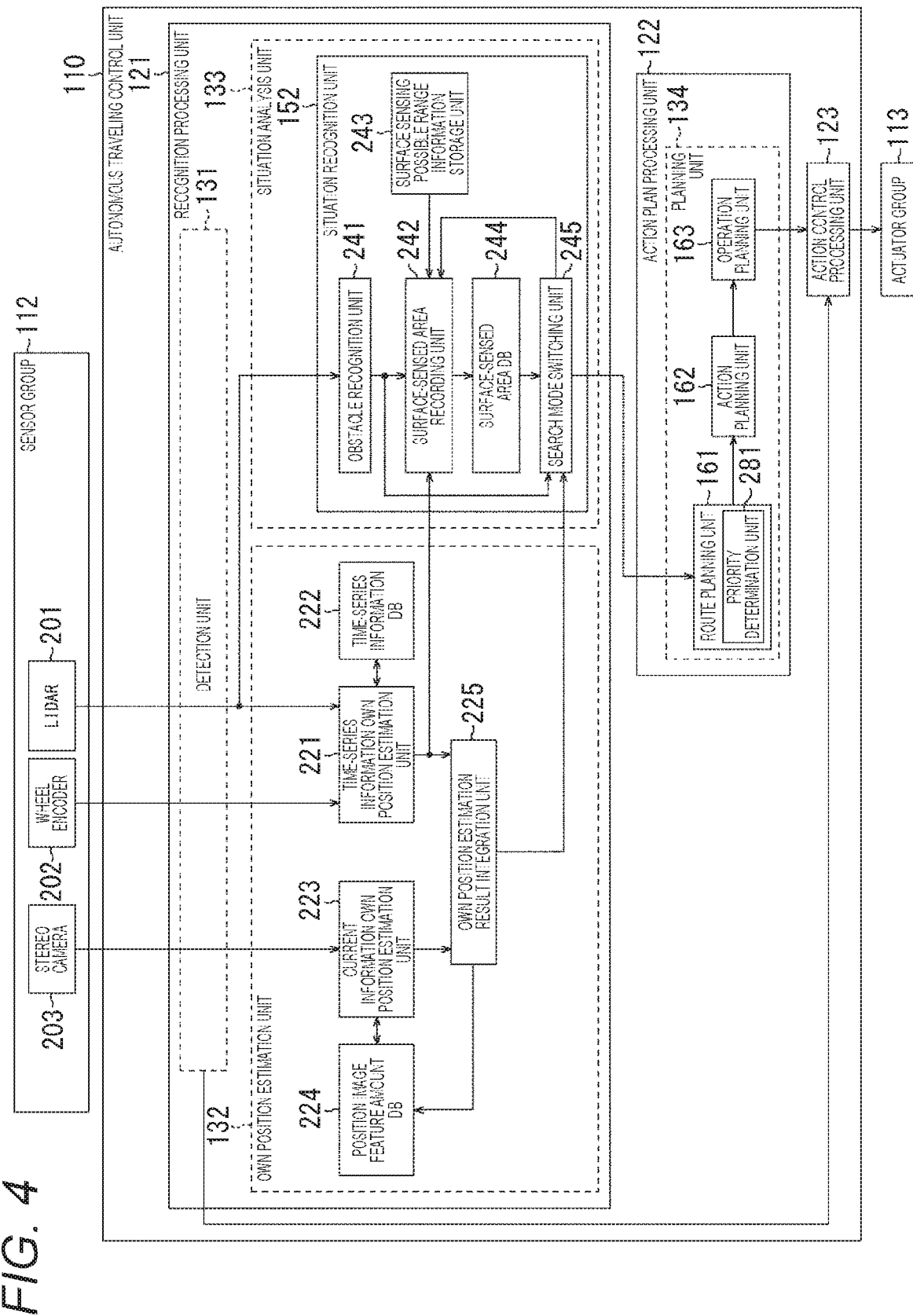
FIG. 4 is a detailed block diagram of a configuration example around a recognition processing unit and an action plan processing unit according to the present disclosure.

Next, a specific configuration example of the recognition processing unit 121 of the autonomous traveling control unit 110 corresponding to the recognition processing unit 31 in the mobile body control system 100 of FIG. 3 will be described with reference to FIG. 4.

Note that although an example in which the mobile body is a mobile body 11 including a wheeled mobile robot will be described here, the mobile body may be any other walking robot, vehicle, or the like.

The sensor group 112 includes a LIDAR 201, a wheel encoder 202, and a stereo camera 203. As a matter of course, other sensors may be used as long as the mobile body is a quadrupedal walking robot, a vehicle, or the like.

The LIDAR 201 obtains the distance to an object around the mobile body 11 as three-dimensional point cloud data, and outputs the data as time-series information to a time-series information own position estimation unit 221 of the own position estimation unit 132 and an obstacle recognition unit 241 of the situation recognition unit 152 via the detection unit 131.

The wheel encoder 202 detects position information (X, Y, Z), posture (quaternion), velocity (dx, dy, dz), acceleration (ax, ay, az), and angular velocity (wx, wy, wz) of the mobile body 11 and outputs a result as time-series information to the time-series information own position estimation unit 221 via the detection unit 131.

The stereo camera 203 images a parallax image around the mobile body 11 and outputs the parallax image to a depth image generation unit 226 via the detection unit 131.

The own position estimation unit 132 includes the time-series information own position estimation unit 221, a time-series information DB 222, a current information own position estimation unit 223, a position image feature amount DB 224, and an own position estimation result integration unit 225.

The time-series information own position estimation unit 221 stores, in the time-series information DB 222, time-series information of the own position and the position of an obstacle in the surroundings, and the like supplied from the LIDAR 201 and the wheel encoder 202. Furthermore, the time-series information own position estimation unit 221 reads time-series information from the past to the present as necessary, estimates the own position on the basis of the read time-series information from the past to the present, and supplies a result to the own position estimation result integration unit 225. Here, the time-series information own position estimation unit 221 estimates the own position on the basis of, for example, simultaneous localisation and mapping (SLAM) on the basis of the read time-series information from the past to the present.

For a specific own position estimation method using the simultaneous localisation and mapping (SLAM) by the time-series information own position estimation unit 221, see "Own Position Estimation and Environment Recognition of a Mobile Robot Using Extended Kalman Filter", Yusuke Morimoto, Toru Seinamerikawa, "Simultaneous Localisation and Mapping (SLAM): Part I The Essential Algorithms Hugh Durrant-Whyte, Fellow, IEEE, and Tim Bailey", and "Simultaneous Localisation and Mapping (SLAM): Part II State of the Art Tim Bailey and See Hugh Durrant-Whyte". Note that the own position estimated by the time-series information own position estimation unit 221 on the basis of time-series information is referred to as a time-series information own position.

The current information own position estimation unit 223 generates a depth image (distance image) on the basis of the parallax image supplied from the stereo camera 203, extracts an image feature amount of the depth image, estimates the own position on the basis of information of the position corresponding to the extracted feature amount from the position image feature amount DB 224 in which positions and image feature amounts are stored in association, and supplies an estimation result to the own position estimation result integration unit 225. Note that the own position estimated by the current information own position estimation unit 223 on the basis of the current information will be referred to as a current information own position.

The own position estimation result integration unit 225 integrates the time-series information own position and the current information own position according to reliability or the like depending on respective situations of, for example, the LIDAR 201, the wheel encoder 202, and the stereo camera 203, and outputs an integrated position to the situation recognition unit 152 as an own position estimation result. Note that the own position estimation result integration unit 225 registers the obtained position information and the image feature amount of the depth image detected at a timing thereof in association with each other in the position image feature amount 224. That is, by registering the feature amount of the depth image at the timing thereof in association with a position estimated as the own position, the image feature amount of the corresponding depth image surely exists for a position once passed, and thus it is possible to estimate the own position with high accuracy.

The situation recognition unit 152 includes an obstacle recognition unit 241, a surface-sensed area recording unit 242, a surface sensing possible range information storage unit 243, a surface-sensed area DB 244, and a search mode switching unit 245.

The obstacle recognition unit 241 recognizes an obstacle around the mobile body 11 on the basis of three-dimensional point cloud information of the distance to an object such as an obstacle around the mobile body 11 detected by the LIDAR 201, and outputs the recognition result to the surface-sensed area recording unit 242.

The surface-sensed area recording unit 242 obtains a surface-sensed area of an obstacle by the stereo camera 203 on the basis of information of an angle of view and an imaging range to be an imaging range of the stereo camera 203 stored in the surface sensing possible range information storage unit 243, information of the time-series information own position including a direction of the mobile body 11, and an obstacle recognition result, and registers the result in the surface-sensed area DB 244.

Figure 5:
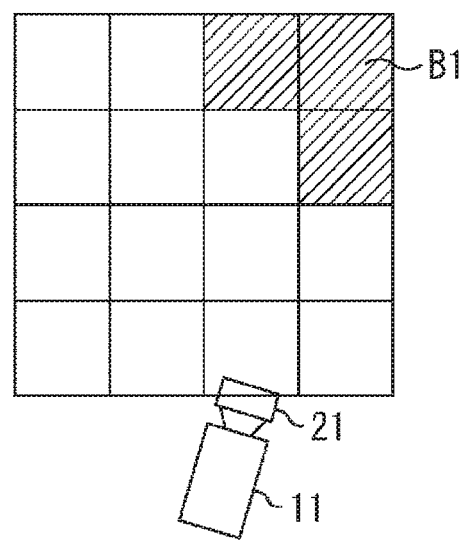
FIG. 5 is a diagram describing an obstacle recognition result.

That is, from the information of the time-series information own position (including information of the direction of the mobile body 11 itself) and the obstacle recognition result, for example, a positional relationship between the obstacle B1 and the mobile body 11 that is itself becomes clear, as illustrated in FIG. 5. Note that in FIG. 5, the positional relationship between the mobile body 11 and the obstacle B1 is indicated by an occupancy grid map, which may be another map.

Figure 6:
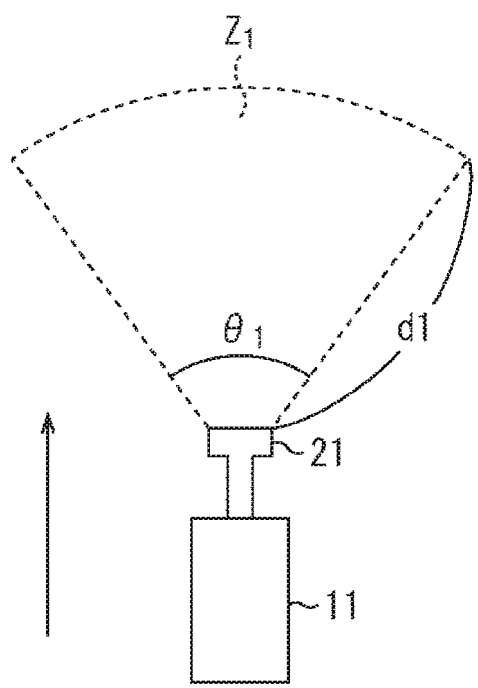
FIG. 6 is a diagram describing a surface sensing possible range.

Moreover, the surface sensing possible range information is, for example, information for determining a range Z1 where the surface of the obstacle B1 can be sensed by the stereo camera 203 (the sensor group 21 in FIG. 6) indicated by dotted lines in FIG. 6. Here, the range Z1 in FIG. 6 is a range specified by a viewing angle θ1 of the stereo camera 203 (the sensor group 21 in FIG. 6) and an imaging possible distance d1, and is a range where the surface of the obstacle B1 can be sensed by the stereo camera 203.

The surface-sensed area recording unit 242 obtains a sensed area (area on the obstacle B1 imaged as a parallax image) as a surface-sensed surface area on the basis of information of the positional relationship between the mobile body 11 and the obstacle B1, as well as the surface sensing possible range information. That is, for example, in a case of FIG. 7, an area included in the surface sensing possible range Z1 indicated by dotted lines on the surface of the obstacle B1 is obtained as a surface-sensed surface area R1.

Then, the surface-sensed area recording unit 242 records information of the obtained surface-sensed area in the surface-sensed area DB 244 in association with a time-series information estimated position and direction of the mobile body 11 and the obstacle recognition result.

The search mode switching unit 245 determines whether or not it is in the own position indefinite state on the basis of whether or not it is immediately after power is turned on and, if it is not in the own position indefinite state, operates in the operation mode by the normal mode and outputs the own position estimation result and the obstacle recognition result to the action plan processing unit 122. Note that although a case where the own position indefinite state is immediately after power is turned on will be described here, the own position indefinite state may be any other state. The own position indefinite state may be, for example, any other state as long as a self-estimation result changes rapidly and continuity of information of the own position is lost, such as detection of a held-up state or a slip.

The action plan processing unit 122 includes the route planning unit 161, the action planning unit 162, and the operation planning unit 163, and executes different processes in the search mode from those in a case where the operation mode is the normal mode.

In an operation in the normal mode, the route planning unit 161 plans a route to a destination on the basis of the own position estimation result and the obstacle recognition result, the action planning unit 162 generates an action plan on the basis of the planned route, and the operation planning unit 163 generates an operation plan according to the action plan and outputs the operation plan to the action control processing unit 123.

On the other hand, when operation in the search mode is instructed from the search mode switching unit 245, the action plan processing unit 122 changes the operation mode to the search mode. At this time, the search mode switching unit 245 supplies information of the surface-sensed area stored in the surface-sensed area DB 244 to the action plan processing unit 122, and instructs the operation in the search mode.

When the operation mode is the search mode, since it is in the own position indefinite state, it is necessary to plan actions so that the surroundings can be searched and positions and the like of obstacles in the surroundings can be collected efficiently, in order to re-determine the own position.

The route planning unit 161 grasps in which direction and at what distance an obstacle exists with respect to the position and the direction of the mobile body 11 as the own position on the basis of the information of the surface-sensed area via the search mode switching unit 245.

Figure 8:
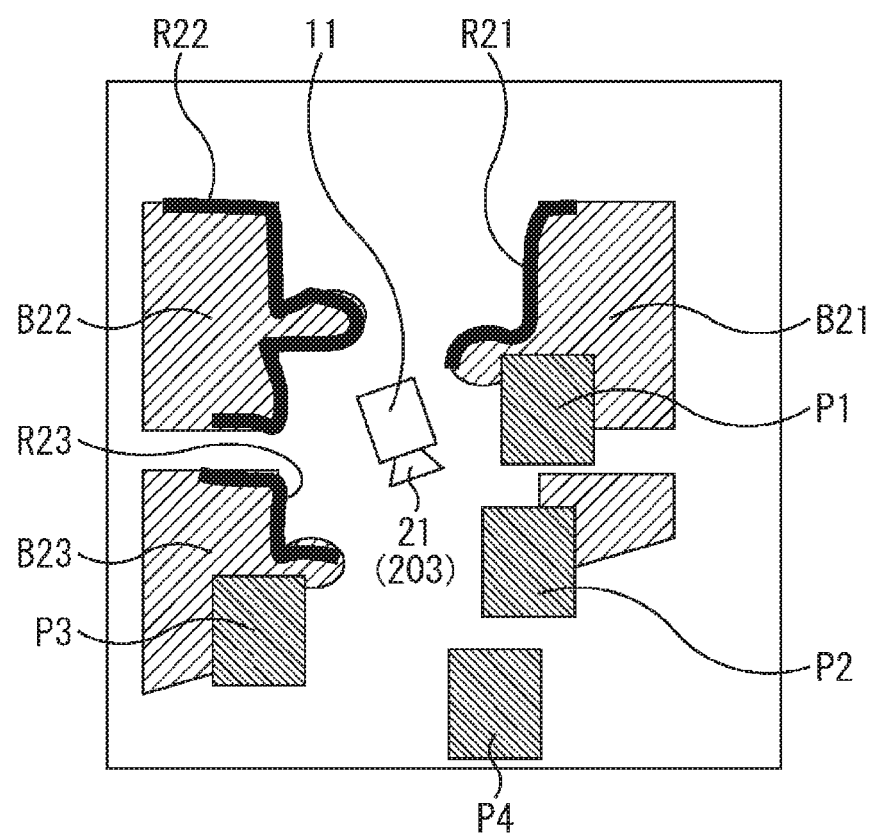
FIG. 8 is a diagram describing a method of setting priorities.

For example, as illustrated in FIG. 8, it is considered a case where obstacles B21 to B23 exist around the mobile body 11, and surface-sensed areas R21 to R23 where surface sensing is completed on the obstacles B21 to B23 can be grasped.

The route planning unit 161 divides an area where surface sensing is not completed into a plurality of areas, and individually sets the divided areas as waypoints, for example. For example, in a case of FIG. 8, the route planning unit 161 sets, for example, waypoints P1 to P4 in each of the divided areas, and plans routes of all patterns that pass through all the waypoints P1 to P4.

The route planning unit 161 includes a priority determination unit 281, and causes this unit to set a priority to each of the waypoints P1 to P4 on the basis of information of the routes of all patterns passing through all the waypoints P1 to P4 and a priority condition.

For example, in FIG. 8, the priority is a value set according to the order of the waypoints P1 to P4 in a route on which a priority cost obtained by the priority condition and body movement information is lowest in a case where all the routes are considered that surely pass through all the waypoints P1 to P4.

Here, the priority condition is a condition that needs to have the highest priority upon setting a route and is a total traveling distance, a total power consumption, or the like, and various conditions can be set.

Furthermore, the body movement information of the mobile body 11 is information related to movement performance of the mobile body 11 and include, for example, a maximum speed, a highest acceleration, a minimum turning radius, and a height of a crossable step on a path, and the like of the mobile body 11 in a case where the priority condition is the total traveling distance. Moreover, in a case where the priority condition is the total power consumption, the body movement information of the mobile body 11 includes a power consumption of the mobile body 11 per unit distance and a charging capacity of the battery, and the like.

Moreover, the priority cost is a cost set on the basis of the priority condition and the body movement information, and is a cost related to a traveling distance if the priority condition is the total traveling distance, or a cost related to a power consumption if the priority condition is the total power consumption. The priority determination unit 281 of the route planning unit 161 calculates the priority cost for all the routes, and sets priorities in an order of passing through the waypoints on the route on which the priority cost is lowest.

For example, there are considered priority costs when there are a first route to travel in the order of waypoints P1, P2, P3, P4 and a second route to travel in the order of waypoints P1, P3, P2, P4, and the total traveling distance with respect to these two routes is the priority condition. If the second route has a shorter total traveling distance and a lower priority cost than the first route, the priorities are set in the order of passing through the waypoints in the second route. That is, according to the order of the waypoints P1 to P4 in the second route, the priority of waypoint P1 is set to the first, the priority of waypoint P3 is set to the second, the priority of waypoint P2 is set to the third, and the priority of waypoint P4 is set to the fourth.

Then, the route planning unit 161 plans all routes that pass through each of the waypoints P1 to P4, calculates a route cost for every route on the basis of the priorities, areas in which sensing is possible by the sensor group 21 of the mobile body 11, and a traveling condition, selects a route with the lowest route cost, and generates an action plan based on the selected route.

Here, the traveling condition is a condition having a priority related to traveling upon setting a route to be searched for and is a condition having a priority related to traveling such that, for example, waypoints are passed through in descending order of priorities or traveling is performed in a shortest time even by ignoring the priorities of the waypoints, and can be set freely.

Furthermore, the route cost is a measure to quantitatively represent relative advantages and disadvantages of routes in all possible route sets, which is set on the basis of the priorities of waypoints and the traveling condition having a priority in route setting. For example, there is considered a case of setting a route using an A* (star) algorithm that divides a space that is selectable as a route into a grid pattern, performs arrival determination, and further optimizes the weight of each route to set the best path (route) that minimizes cost.

At this time, in order to set a route that satisfies the traveling condition that a waypoint with a higher priority is reached earlier, the product of the priority of each waypoint and a time for traveling to the corresponding waypoint is set as a route cost, and a route on which the route cost is lowest is selected. Thus, a route on which a waypoint with a higher priority is reached earlier is set from among a plurality of conceivable routes.

Through such processing, the route planning unit 161 plans a route needed in a search for efficiently implementing surface sensing of an obstacle in the surroundings.

Thus, even in a case of being in the own position indefinite state, it is possible to efficiently obtain the surrounding information and to re-estimate the own position by performing sensing while efficiently searching the surroundings. As a result, even when it has fallen into the own position indefinite state, it is possible to quickly return to a state that the own position can be obtained, and the operation mode can be returned from the search mode to the normal mode early.

<Own Position Estimation Process>

Figure 9:
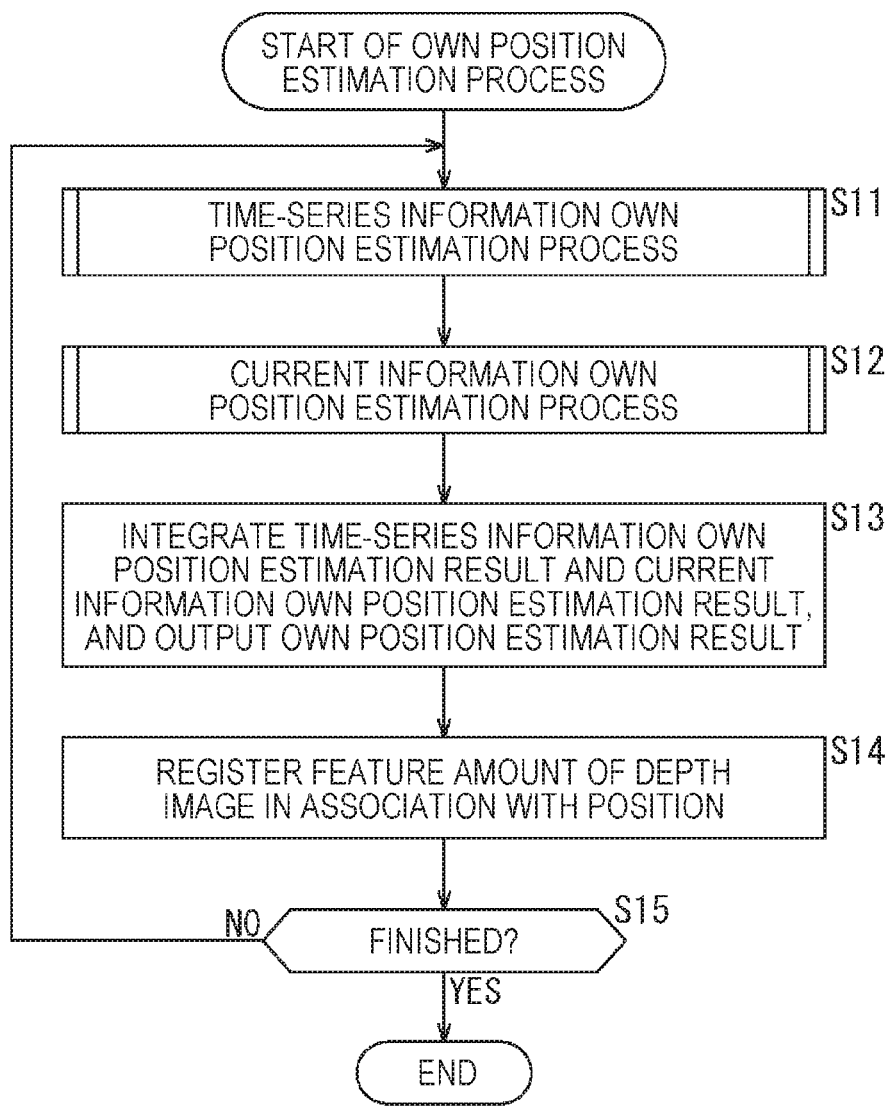
FIG. 9 is a flowchart describing an own position estimation process.

Next, an own position estimation process will be described with reference to a flowchart in FIG. 9.

In step S11, the time-series information own position estimation unit 221 executes a time-series information own position estimation process to estimate a time-series information own position, and outputs the time-series information own position to the own position estimation result integration unit 225 and the surface-sensed area recording unit. Note that the time-series information own position estimation process will be described later with reference to the flowchart in FIG. 10.

Figure 11:
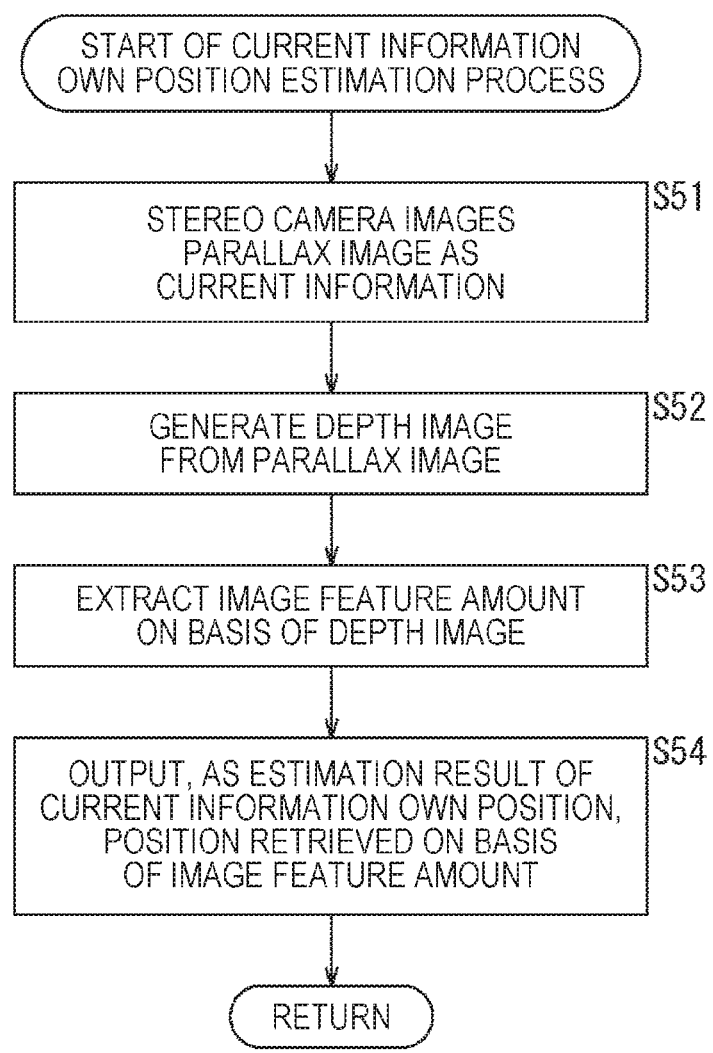
FIG. 11 is a flowchart describing a current information own position estimation process in FIG. 9.

In step S12, the current information own position estimation unit 223 executes a current information own position estimation process to estimate a current information own position, and outputs the current information own position to the own position estimation result integration unit 225. Note that the current information own position estimation process will be described later with reference to a flowchart in FIG. 11.

In step S13, the own position estimation result integration unit 225 integrates the time-series information own position and the current information own position by, for example, a Kalman filter or a particle filter, and outputs information of the integrated own position as an own position estimation result to the situation recognition unit 152.

In step S14, the own position estimation result integration unit 225 registers the own position estimation result and a feature amount of a depth image obtained from a parallax image that is the current information used for determining the own position estimation result in association with each other in the position image feature amount DB 224.

That is, the position estimated as the own position and the feature amount of the depth image obtained from the parallax image that is the current information used for determining the position are registered in association with each other in the position image feature amount DB 224. Thus, the feature amount of the depth image obtained from the parallax image that is the current information corresponding to a position once passed is accumulated as new information in association with the position. Consequently, when passing through the same position again, the own position can be estimated with high accuracy.

Furthermore, through the above process, the time-series information own position and the current information own position are sequentially obtained, and a mutually integrated position is output as an own position estimation result.

<Time-Series Information Own Position Estimation Process>

Figure 10:
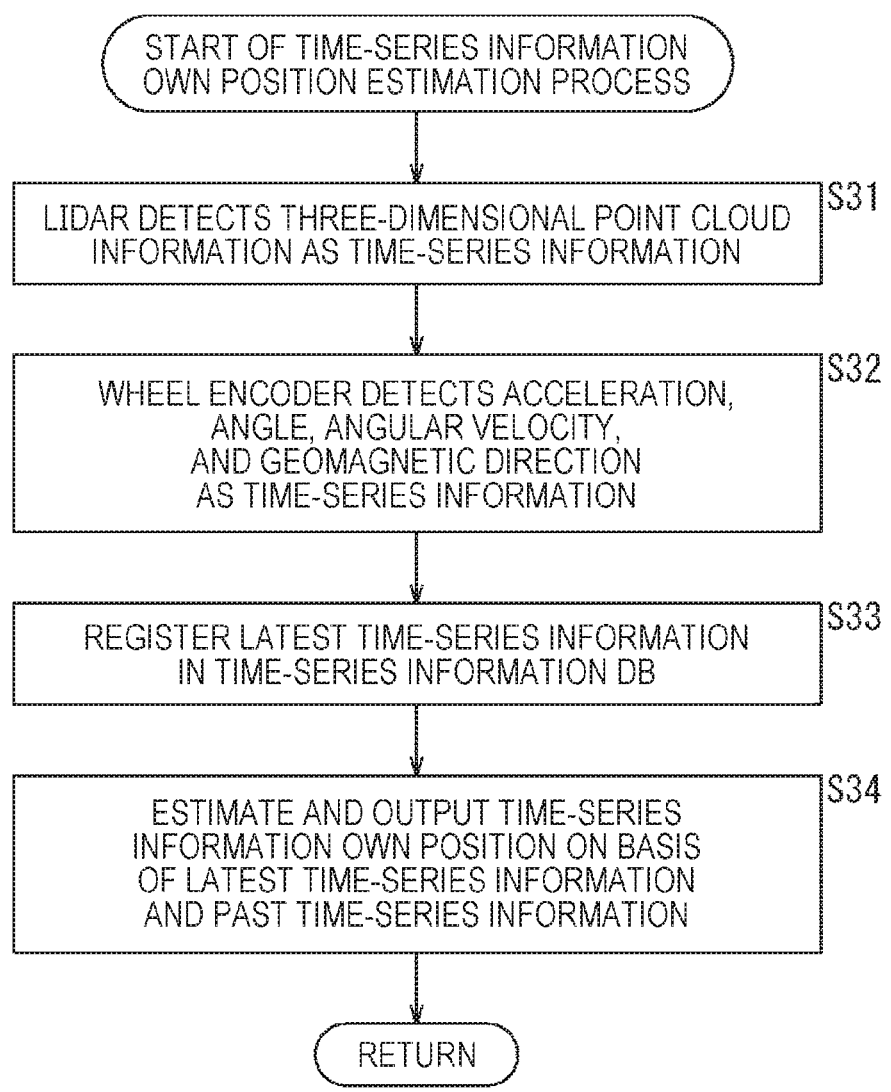
FIG. 10 is a flowchart describing a time-series information own position estimation process in FIG. 9.

Next, the time-series information own position estimation process will be described with reference to the flowchart in FIG. 10.

In step S31, the LIDAR 201 detects the distance to an object around the mobile body 11 as three-dimensional point cloud data, and outputs the time-series information as time-series information to the time-series information own position estimation unit 221 of the own position estimation unit 132 via the detection unit 131.

In step S32, the wheel encoder 202 detects the position information, posture, speed, acceleration, and angular velocity of the mobile body 11, and outputs them as the time-series information to the time-series information own position estimation unit 221 via the detection unit 131.

In step S33, the time-series information own position estimation unit 221 obtains the latest time-series information and registers the information in the time-series information DB 222.

In step S34, the time-series information own position estimation unit 221 estimates the own position from the latest time-series information and past time-series information registered in the time-series information DB 222 by using, for example, a Kalman filter or a particle filter. Then, the time-series information own position estimation unit 221 outputs the own position that is an estimation result to the own position estimation result integration unit 225 as time-series information own position information.

Through the above process, the time-series information detected by the LIDAR 201 and the wheel encoder 202 is sequentially detected and sequentially accumulated in the time-series information DB 222, and the own position is estimated on the basis of the time-series information accumulated in time series from the past to the present accumulated in time series, and is output as a time-series information own position to the own position estimation result integration unit 225.

<Current Information Own Position Estimation Process>

Next, the current information own position estimation processing will be described with reference to the flowchart in FIG. 8.

In step S51, the stereo camera 203 images a parallax image around the mobile body 11, and outputs the image as current information to the current information own position estimation unit 223 via the detection unit 131.

In step S52, the current information own position estimation unit 223 generates a depth image (distance image) on the basis of the parallax image supplied from the stereo camera 203.

In step S53, the current information own position estimation unit 223 extracts an image feature amount on the basis of the generated depth image.

In step S54, the current information own position estimation unit 223 estimates the own position on the basis of information of a position corresponding to the extracted image feature amount from the position image feature amount DB 224 in which positions and image feature amounts are stored in association with each other. Then, the current information own position estimation unit 223 supplies the own position that is an estimation result as the current information own position to the own position estimation result integration unit 225.

Through the above process, the parallax image is imaged as current information by the stereo camera 203, the depth image is generated from the parallax image, the image feature amount of the generated depth image is extracted, and the current information own position is estimated on the basis of position information registered in association with the image feature amount and is output to the own position estimation result integration unit 225.

<Obstacle Recognition Process>

Figure 12:
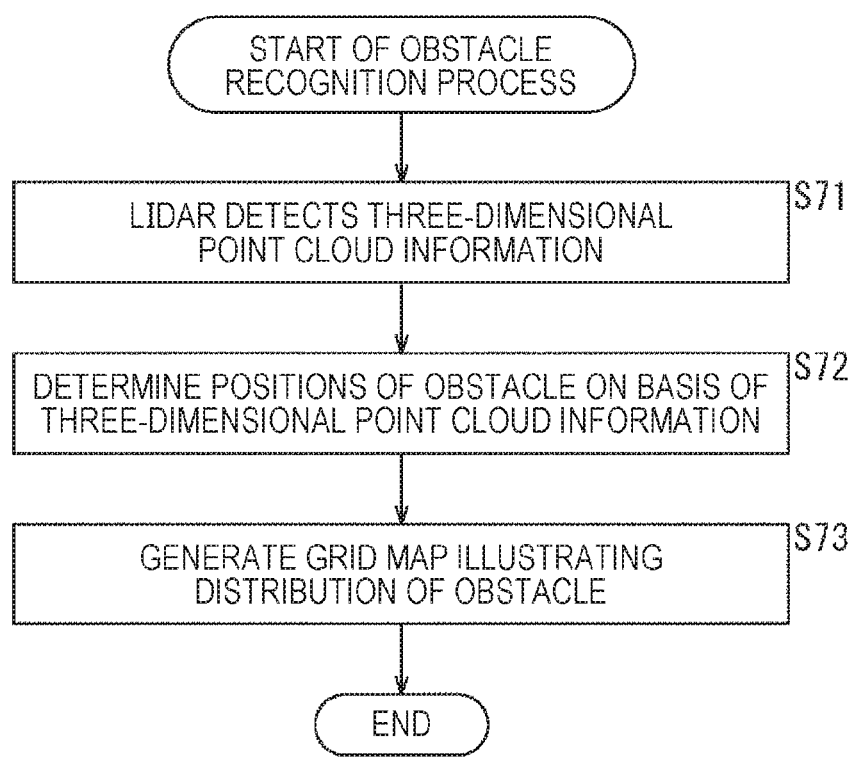
FIG. 12 is a flowchart describing an obstacle recognition process.

Next, an obstacle recognition processing will be described with reference to a flowchart in FIG. 12.

In step S71, the LIDAR 201 detects the distance to an object around the mobile body 11 as three-dimensional point cloud data, and outputs the data as time-series information to the time-series information own position estimation unit 221 of the own position estimation unit 132 via the detection unit 131. Note that this process is similar to the process in step S31 described with reference to the flowchart in FIG. 10.

In step S72, the obstacle recognition unit 241 recognizes the position of an obstacle around the mobile body 11 on the basis of the three-dimensional point cloud data of the distance to the object around the mobile body 11.

In step S73, the obstacle recognition unit 241 generates a grid map on the basis of the information of the position of a recognized obstacle around the mobile body 11, and outputs the grid map to the surface-sensed area recording unit 242 and the search mode switching unit 245.

Through the above process, an obstacle recognition result that represents information of the position of the obstacle around the mobile body 11 is generated as, for example, a grid map as illustrated in FIG. 5, and is output to the surface-sensed area recording unit 242 and the search mode switching unit 245.

<Surface-Sensed Area Recording Process>

Figure 13:
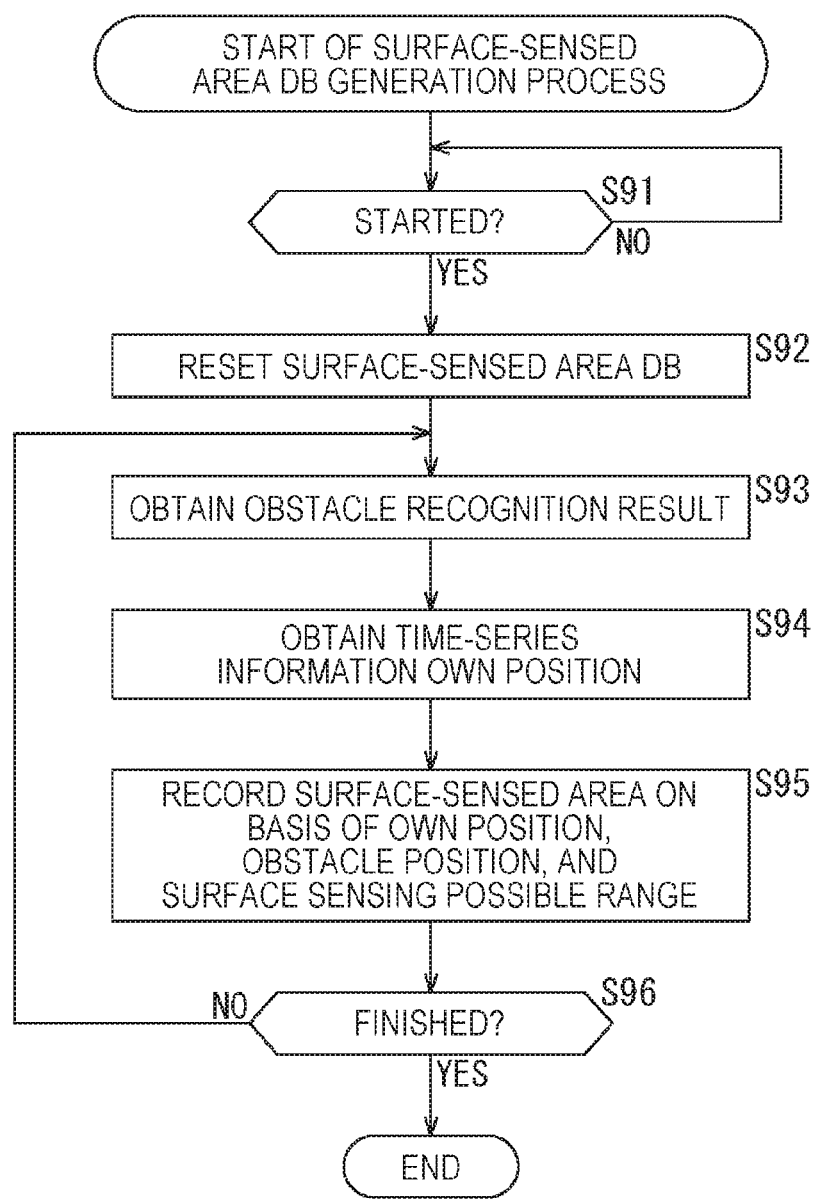
FIG. 13 is a flowchart describing a surface-sensed area DB recording process.

Next, a surface-sensed area recording process will be described with reference to a flowchart in FIG. 13. Note that the surface-sensed area recording process is a process executed when an operation mode as described later becomes the search mode.

In step S81, the surface-sensed area recording unit 242 determines whether or not start of the surface-sensed area recording process has been instructed by the search mode switching unit 245, and a similar process is repeated until the start is instructed. Then, in step S81, when the start of the surface-sensed area recording process is instructed, the process proceeds to step S82.

In step S82, the surface-sensed area recording unit 242 resets the surface-sensed area DB 244.

In step S93, the surface-sensed area recording unit 242 obtains an obstacle recognition result from the obstacle recognition unit 241.

In step S94, the surface-sensed area recording unit 242 obtains information of the time-series information own position from the time-series information own position estimation unit 221.

Figure 7:
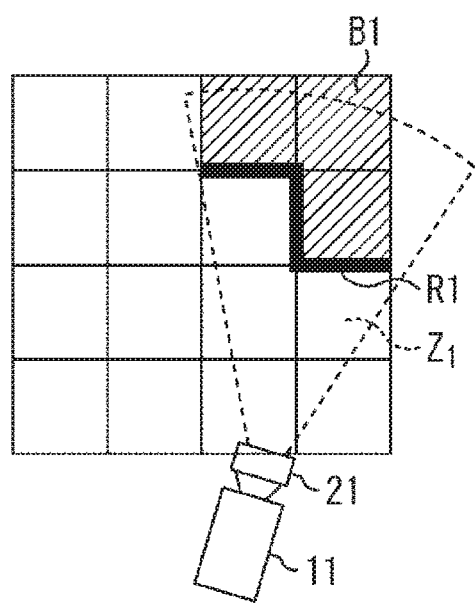
FIG. 7 is a diagram describing a surface-sensed area.

In step S95, the surface-sensed area recording unit 242 obtains a surface-sensed area as described with reference to FIG. 7 on the basis of information of the time-series information own position, the obstacle position that can be obtained from the obstacle recognition result, and information of the surface sensing possible range stored in the surface sensing possible range information storage unit 243, and records the surface-sensed area in the surface-sensed area DB 244.

In step S96, the surface-sensed area recording unit 242 determines whether or not end of process has been instructed, and when the end has not been instructed, the process returns to step S93. That is, until the end of process is instructed, the processes of steps S93 to S96 are repeated, and information of the surface-sensed area is sequentially accumulated in the surface-sensed area DB 244.

Then, in step S95, when the end of process is instructed, the process ends.

Through the above process, in the search mode, information of the area of the surface of an obstacle that has been imaged (has been sensed) by the stereo camera 203 in the surroundings of the mobile body 11 is accumulated as the surface-sensed areas R21 to R23 of the obstacles B21 to B23, for example, as illustrated in FIG. 8.

<Autonomous Traveling Control Process>

Figure 14:
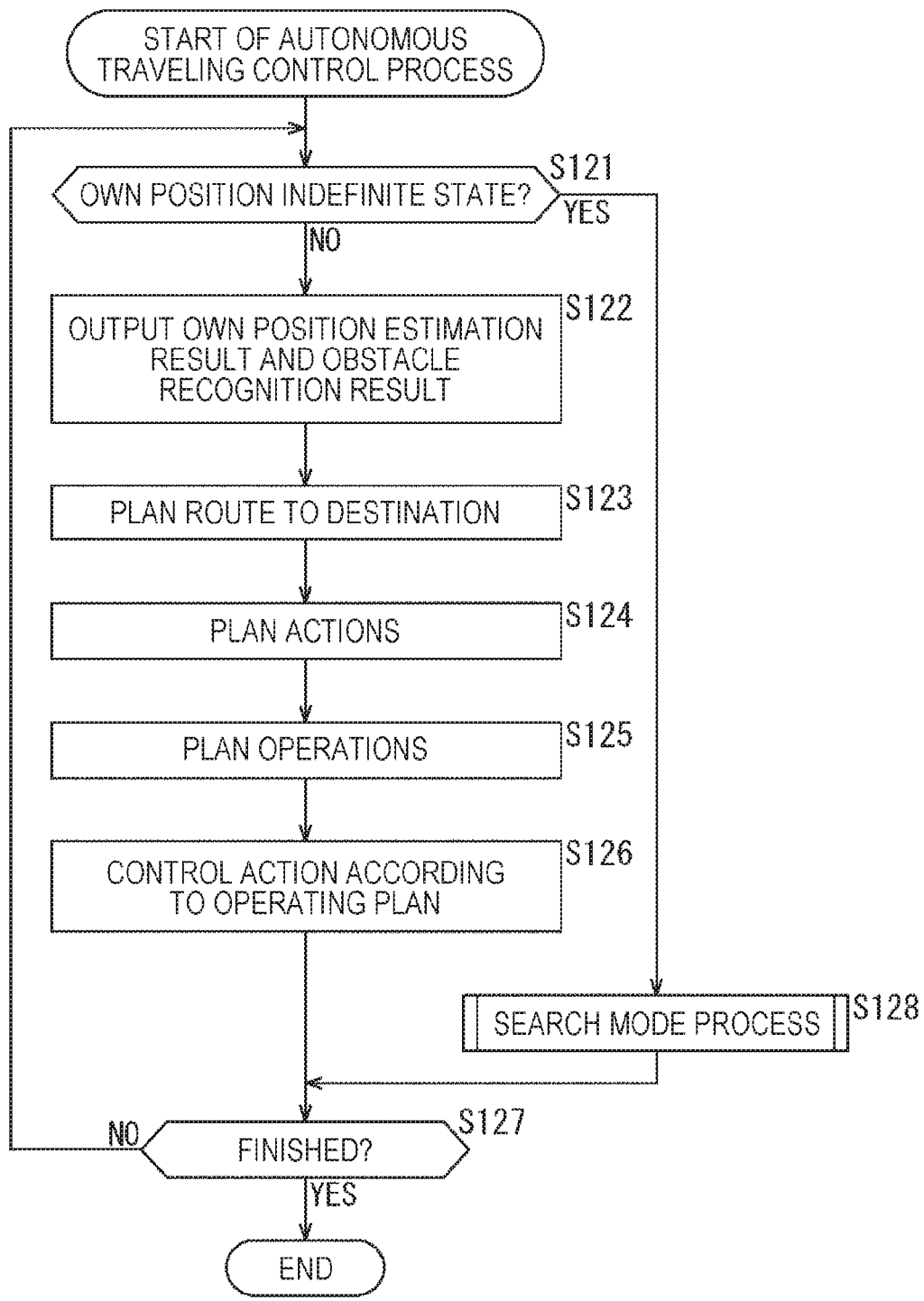
FIG. 14 is a flowchart describing an autonomous traveling control process.

Next, an autonomous traveling control process in the mobile body control system 100 in FIG. 4 will be described with reference to a flowchart in FIG. 14.

In step S121, the search mode switching unit 245 determines whether or not it is in an own position indefinite state. For example, the search mode switching unit 245 determines whether or not it is in the own position indefinite state on the basis of, for example, whether or not it is immediately after power is turned on.

If it is determined in step S121 that it is not in the own position indefinite state, the process proceeds to step S122.

In step S122, the search mode switching unit 245 outputs the own position estimation result and the obstacle recognition result to the route planning unit 161 in the planning unit 134 of the action plan processing unit 122.

In step S123, the route planning unit 161 plans a route to a destination, and outputs the route to the action planning unit 162.

In step S124, the action planning unit 162 plans actions on the basis of the route to the destination, and outputs the actions as an action plan to the operation planning unit 163.

In step S125, the operation planning unit 163 plans operations on the basis of the action plan supplied from the action planning unit 162, and outputs the operations as an operation plan to the action control processing unit 123.

In step S126, the action control processing unit 123 controls an operation of each of the actuators 23a of the actuator group 113 to control an action of the mobile body 11 on the basis of the operation plan.

In step S127, it is determined whether or not end has been instructed, and if it is determined that the end has not been instructed, the process returns to step S121. That is, as long as it has not been in the own position indefinite state, the processes of steps S121 to S127, that is, the processes in the case where the operating state is the normal mode, are repeated, and the mobile body 11 continues autonomous traveling.

On the other hand, if it is determined in step S121 that it is in the own position indefinite state, the process proceeds to step S128.

In step S128, the search mode switching unit 245 performs control to switch the operation mode to the search mode, and execute a search mode process to efficiently search the surroundings of the mobile body 11, and thus surrounding information can be quickly obtained by the stereo camera. Then, processing in the search mode is continued until it becomes possible to appropriately estimate the current information own position, and when it becomes possible to estimate the current information own position, the operation mode returns from the search mode to the normal mode.

<Search mode Process>

Figure 15:
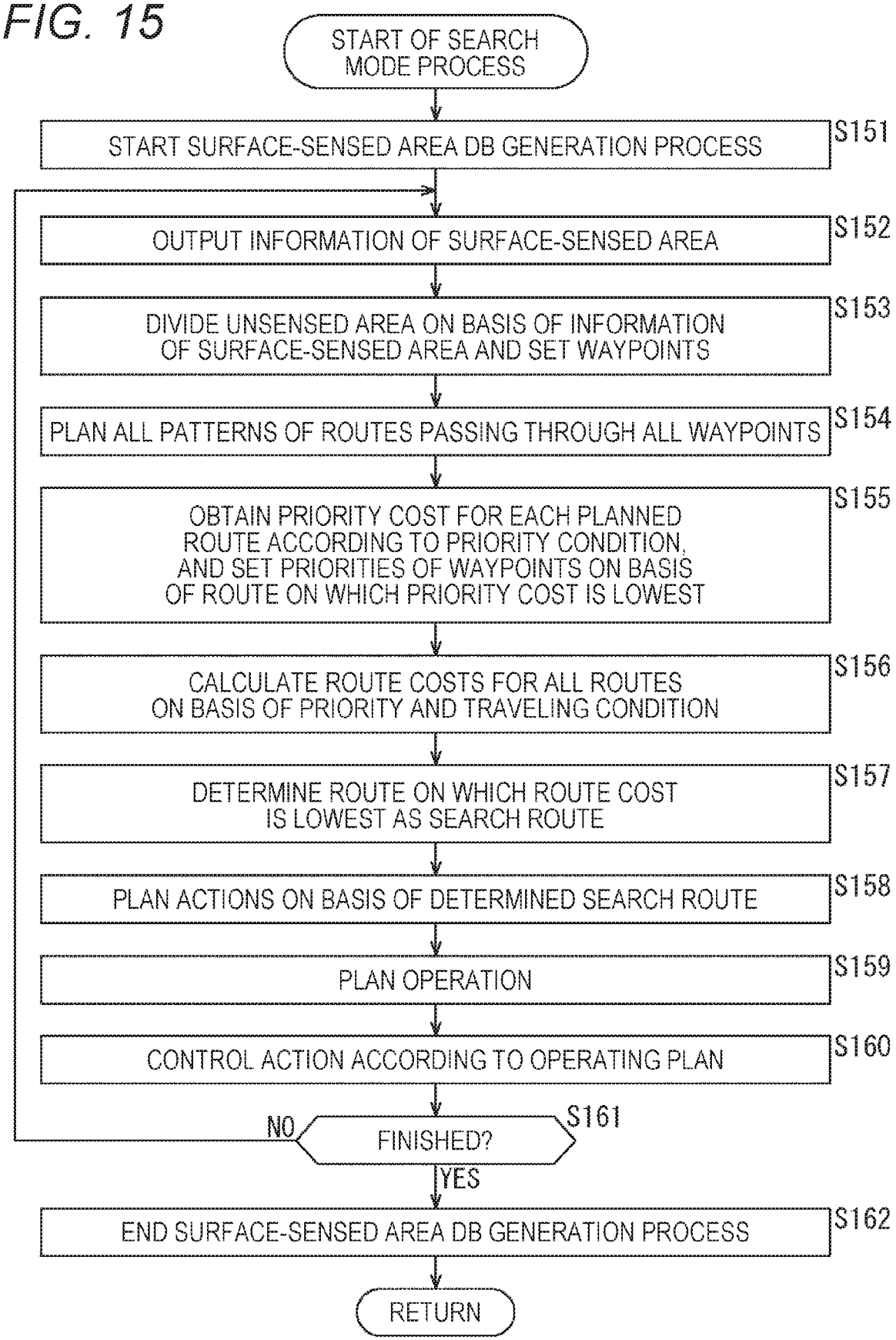
FIG. 15 is a flowchart describing a search mode process.

Next, a search mode process will be described with reference to a flowchart in FIG. 15.

In step S151, the search mode switching unit 245 instructs the surface-sensed area recording unit 242 to start a surface-sensed area DB generation process. With this instruction, the surface-sensed area DB generation process described with reference to the flowchart in FIG. 13 is started.

In step S152, the search mode switching unit 245 outputs information of the surface-sensed area from the surface-sensed area DB 244 to the route planning unit 161 in the planning unit 134 of the action plan processing unit 122.

In step S153, the route planning unit 161 divides an unsensed area into a plurality of areas on the basis of the information of the surface-sensed area, and sets each of the divided areas as a waypoint.

In step S154, the route planning unit 161 plans all patterns of routes passing through all waypoints including the respective divided areas.

In step S155, the route planning unit 161 controls the priority determination unit 281 to obtain a priority cost for each planned route according to the priority condition, and sets priorities of the waypoints on the basis of a route on which the priority is lowest, as described with reference to FIG. 8.

In step S156, the route planning unit 161 calculates route costs for all routes on the basis of the priorities of the waypoints and the traveling condition.

In step S157, the route planning unit 161 determines a route on which the route cost is lowest as a search route, and outputs the route to the action planning unit 162.

In step S158, the action planning unit 162 plans actions on the basis of the determined search route, and outputs the actions as an action plan to the operation planning unit 163.

In step S159, the operation planning unit 163 plans an operation on the basis of the action plan supplied from the action planning unit 162, and outputs the operation as an operation plan to the action control processing unit 123.

In step S160, the action control processing unit 123 controls an operation of each of the actuators 23a of the actuator group 113 to control an action of the mobile body 11 on the basis of the operation plan.

In step S161, the search mode switching unit 245 determines whether or not to end the search mode process according to whether or not it is no longer in the own position indefinite state. In a case where the own position indefinite state is immediately after power is turned on, whether or not it is in the own position indefinite state may be determined according to whether or not a predetermined time has elapsed since turning-on of the power, whether a predetermined number or more of the time-series information is accumulated and the reliability as the time-series information is increased or not, or the like.

In step S161, if the own position indefinite state continues and the search mode process is not to be ended, the process returns to step S152. In other words, as long as the search mode process is continued, the processes of steps S152 to S161 are repeated to repeatedly set the search route in the search mode on the basis of information of the surface-sensed area that changes every moment, and the mobile body 11 continues searching of the surroundings. Then, when it is no longer in the own position indefinite state, the process proceeds to step S162.

In step S162, the search mode switching unit 245 instructs the surface-sensed area recording unit 242 to end the surface-sensed area DB generation process, and the process ends.

Through the above process, when it has become the own position indefinite state, the operation mode is switched to the search mode, and it is possible to set a search route to be searched so that the surface of an obstacle that is not sensed, that is, not imaged is efficiently imaged from the surface-sensed area imaged by the stereo camera 203 as surrounding information of the mobile body 11.

That is, in the search mode, since it is a state that a route to a destination cannot be set because of the own position indefinite state, a route on which great importance is placed on efficient searching of the surroundings is set, rather than a route for traveling to the destination.

Consequently, it is possible to quickly switch from the search mode to the normal mode, it is possible to quickly change from the own position indefinite state to a state that the own position can be determined, and it is possible to quickly return to the normal mode.

Note that, in the above description, an example has been described in which upon estimating the current information own position, a depth image is generated on the basis of a parallax image imaged by the stereo camera 203 as the current information, and the image feature amount of the generated depth image is used. However, the current information may be other than the parallax image using the stereo camera 203 as long as a depth image can be generated.

For example, as a component that detects the current information, a time-of-flight (ToF) sensor may be used instead of the stereo camera 203. In a case of using the Tof sensor, the surface sensing possible range is represented by a minimum distance, a maximum distance, and an angle of view.

Furthermore, in the above, an example has been described in which the surface sensing possible range includes a possible range and an impossible range and is expressed by, for example, binary values of 0 and 1, but the range may be expressed by values with steps of three or more values, for example, floating-point values with steps between 0 and 1. With such an expression, the surface sensing possible range can express a range that is easy to sense or a range that is difficult to sense, depending on a sensing state and a distance or an angle to an obstacle. Thus, for example, in a range where surface sensing is difficult, processing that can make accuracy of surface sensing equal to that in a range where surface sensing is easy may be performed by increasing the number of times of surface sensing per unit time larger than in the range where surface sensing is easy, or the like.

Moreover, in the above, an example of expressing the obstacle recognition result using a two-dimensional occupancy grid map represented by a set of squares as illustrated in FIG. 5 has been described, but the obstacle recognition result may be expressed using a three-dimensional occupancy grid map including a set of cubes. Thus, the surface sensing possible range may be expressed as a set of squares of two-dimensional fixed size in the horizontal and vertical directions, or may be expressed as a set of cubes of three-dimensional fixed size in the horizontal, vertical, and height directions.

Furthermore, information of the surface-sensed area registered in the surface-sensed area DB 243 may be erased together with the obstacle recognition result according to a time length that a recorded state has continued.

In other words, by deleting information of the surface-sensed area together with information of the obstacle recognition result registered in association therewith when a predetermined time elapses, an area sensed once may be surface-sensed again in the search mode process, and thus a route for surface sensing is set again.

In this manner, by deleting information of a surface-sensed area with a lapse of time, an area surface-sensed once may be surface-sensed again after passage of time and, for example, surrounding information can be appropriately obtained even in a situation where a shape or position of a surrounding obstacle changes.

Moreover, information of the surface-sensed area may be, for example, deleted so that values thereof decrease over time according to a predetermined forgetting function, or for example, in a case where presence or absence of the surface-sensed area is expressed as binary values of 0 or 1, the values may be deleted so as to be 0.

Furthermore, the forgetting function may be a value max(0, T−kt) (max(A, B) is a function of selecting the larger one of A or B) obtained by multiplying an elapsed time t after recording and a maximum value T of recording time by a predetermined coefficient k, or a value kT/t obtained by multiplying the elapsed time t after recording and the maximum value T of recording time by a predetermined coefficient k.

Moreover, the forgetting function may be T (0<t<=B), 0 (B<t) using a predetermined forgetting time B with respect to the elapsed time t after recording and the maximum value T of recording.

Furthermore, in the above, an example has been described in which, in a case where the mobile body 11 is a wheel-type mobile robot, information detected by the LIDAR 201 and the wheel encoder 202 is used as the time-series information, and a parallax image imaged by the stereo camera 203 is used as the current information.

However, the time-series information and the current information are not limited thereto, and may be adapted to the form of the mobile body 11. That is, in a case where the mobile body 11 is a drone, the time-series information may be information detected by a LIDAR and an inertial measurement device (IMU) or an acceleration sensor, and the current information may be information obtained by GNSS.

Furthermore, in a case where the mobile body 11 is a vehicle, the time-series information may be information detected by a LIDAR, and the current information may be information obtained by GNSS. Moreover, in a case where the mobile body 11 is a multi-legged walking robot, the time-series information may be information detected by a LIDAR, an inertial measurement device (IMU), and a sensor attached to an actuator, and the current information may be information obtained by a stereo camera, an inertial measurement device (IMU), and a sensor attached to an actuator.

Moreover, a LIDAR and a ToF sensor may be used instead of the stereo camera 203.

3. Modification Example

Figure 16:
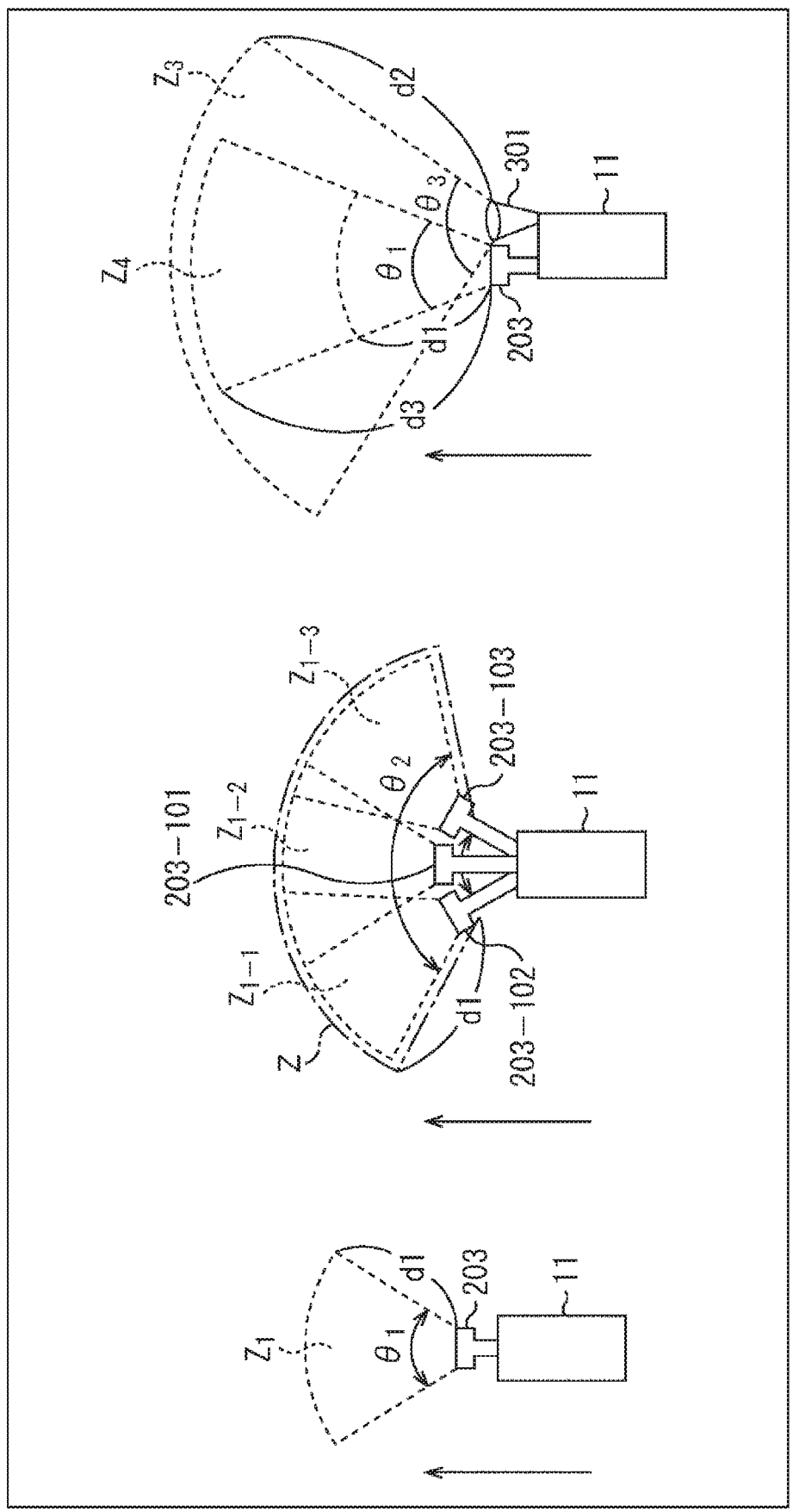
FIG. 16 is a diagram describing a surface-sensed area according to a modification example using a stereo camera.

In the above, an example has been described in which, as illustrated in a left part of FIG. 16, the surface sensing possible range of the stereo camera 203 is fixed with the viewing angle θ1 and the imageable distance d1 in a case where the stereo camera 203 having an imaging direction that is forward with respect to the traveling direction is provided in the traveling direction of the mobile body 11 indicated by an arrow.

However, for example, as illustrated in a center part of FIG. 16, an operation similar to turning head (panning) may be enabled in a horizontal direction in the range from a stereo camera 203-102 whose imaging direction is directed to the left to a stereo camera 203-103 whose imaging direction is directed to the right with respect to a stereo camera 203-101.

In this case, the surface sensing possible range Z is a range including all ranges of respective surface sensing possible ranges Z1-1 to Z1-3 of the stereo cameras 203-101 to 203-103.

Note that in the center part of FIG. 16, an example is illustrated in which the stereo camera 203 is operated similarly to turning the head to the left and right in the horizontal direction (panning), but if an operation similar to turning head in a vertical direction (tilting) can be further performed, the surface sensing possible range can be further increased. Moreover, if the stereo camera 203 is provided with a zoom function, in a wide range in the horizontal and vertical directions, it is possible to extend the imaging possible distance far, and thus the surface sensing possible range can be further extended.

Furthermore, as for an imaging possible distance of the stereo camera 203, for example, as illustrated in the right part of FIG. 16, an illumination 301 that can illuminate a range Z3 with a viewing angle θ3 and a distance d2 may be provided, which is sufficiently larger than the range Z1 formed by the viewing angle θ1 of the surface sensing range Z1 and the imaging distance d1 of the stereo camera 203. With such a configuration, for example, when the imaging distance of the stereo camera 203 is a limit due to illuminance, the imaging possible distance can be set to, for example, a distance d3 longer than the distance d1 by increasing the illuminance.

Moreover, the configuration of the center part and the right part in FIG. 16 may be combined, and panning-tilting of the illumination 301 may be performed in accordance with panning-tilting of the stereo camera 203 in the imaging direction. Also in this manner, it is possible to widen the surface sensing possible range.

By increasing the surface sensing possible range in this manner, the amount of information that can be detected from the surroundings per unit time increases. Thus, the surface sensing speed can be substantially increased, and cost can be reduced more for calculation of the route cost. Consequently, it is possible to make the return from the search mode to the normal mode faster.

4. Example of Execution by Software

Incidentally, the series of processes described above can be executed by hardware, but can also be executed by software. In a case where the series of processes are executed by software, a program constituting the software is installed from a recording medium into a computer built into, for example, dedicated hardware or a general-purpose computer that is capable of executing various functions by installing various programs, or the like.

Figure 17:
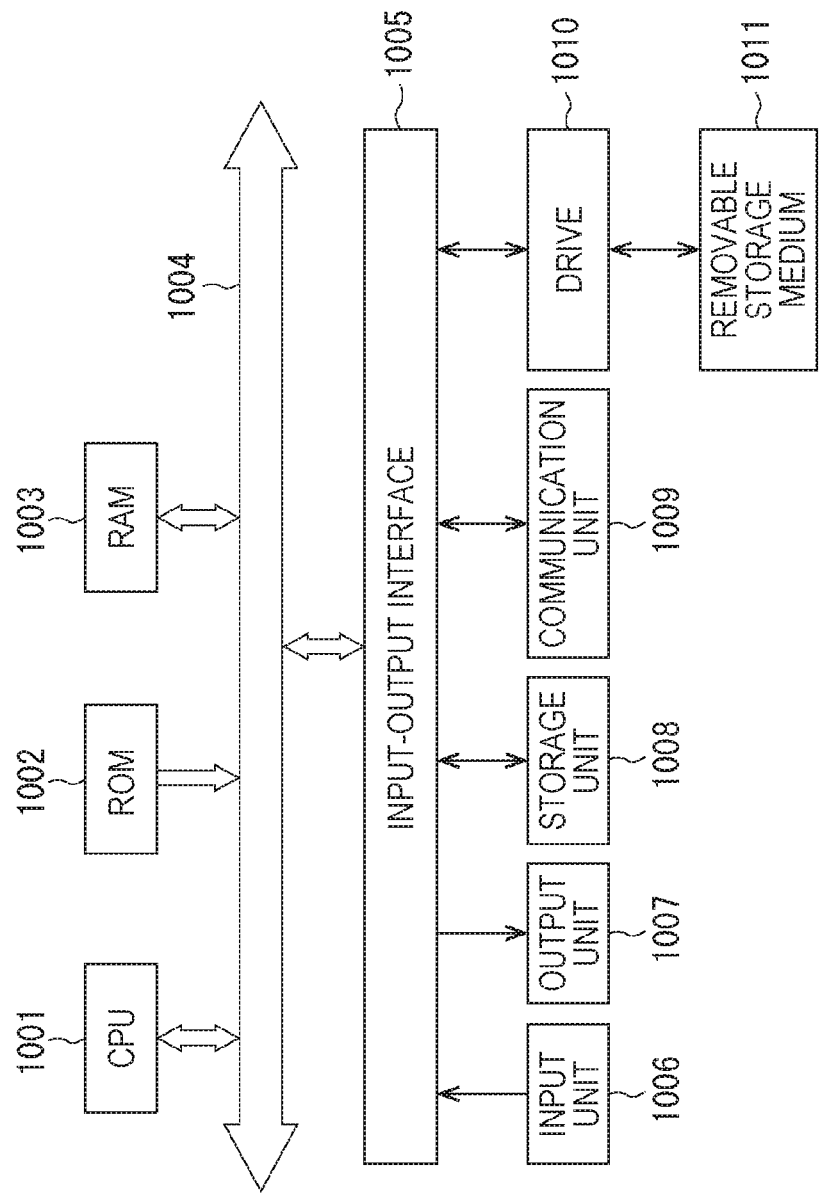
FIG. 17 is a diagram describing a configuration example of a general-purpose computer.

FIG. 17 illustrates a configuration example of a general-purpose computer. This personal computer includes a central processing unit (CPU) 1001. An input-output interface 1005 is connected to the CPU 1001 via a bus 1004. A read only memory (ROM) 1002 and a random access memory (RAM) 1003 are connected to the bus 1004.

To the input-output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and executes a communication process via a network represented by the Internet are connected. Furthermore, a drive 1010 that reads and writes data from and to a removable medium 1011 such as a magnetic disk (including a flexible disk), an optical disk (including a compact disc-read only memory (CD-ROM), a digital versatile disc (DVD)), a magneto-optical disk (including a Mini Disc (MD)), or a semiconductor memory is connected.

The CPU 1001 execute various processes according to a program stored in the ROM 1002 or a program that is read from the removable media 1011 such as a magnetic disk, an optical disk, a magneto-optical disk, or a semiconductor memory, installed into the storage unit 1008, and then loaded from the storage unit 1008 to the RAM 1003. The RAM 1003 also appropriately stores data necessary for the CPU 1001 to execute various processes, and the like.

In the computer configured as described above, for example, the CPU 1001 loads the program stored in the storage unit 1008 into the RAM 1003 via the input-output interface 1005 and the bus 1004 and executes the program, to thereby perform the above-described series of processes.

The program executed by the computer (CPU 1001) can be provided by being recorded on, for example, a removable medium 1011 as a package medium or the like. Furthermore, the program can be provided via a wired or wireless transmission medium such as a local area network, the Internet, or digital satellite broadcasting.

In the computer, the program can be installed in the storage unit 1008 via the input-output interface 1005 by mounting the removable medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program for processing in time series in the order described in the present description, or a program for processing in parallel or at a necessary timing such as when a call is made.

Note that the CPU 1001 in FIG. 17 implements the functions of the autonomous traveling control unit 110 in FIG. 3. Furthermore, the storage unit 1008 in FIG. 17 implements the storage unit 109 in FIG. 3.

Furthermore, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that embodiments of the present disclosure are not limited to the above-described embodiments, and various modifications are possible without departing from the scope of the present disclosure.

For example, the present disclosure can have a configuration of cloud computing in which one function is shared by a plurality of devices via a network and processing is performed in cooperation.

Furthermore, each step described in the above-described flowchart can be executed by one device, or can be executed in a shared manner by a plurality of devices.

Moreover, when a plurality of processes is included in one step, the plurality of processes included in the one step can be executed in a shared manner by a plurality of devices, in addition to being executed by one device.

Note that the present disclosure may also have the following configurations.

<1> A control device including:
an own position estimation unit that estimates an own position;
an obstacle position information generation unit that generates obstacle position information including a position of an obstacle in surroundings;
a surface sensing unit that senses a surface of the obstacle;
a surface-sensed area recording unit that records a surface-sensed area of the obstacle on the basis of the own position, the obstacle position information, and a surface sensing possible range of the surface sensing unit; and
a route planning unit that plans a route on the basis of the surface-sensed area of the obstacle.

<2> The control device according to <1>, in which
the surface-sensed area recording unit records, as the surface-sensed area of the obstacle, a surface of the obstacle within the surface sensing possible range of the surface sensing unit.

<3> The control device according to <2>, in which
the route planning unit includes
a priority setting unit that sets an incomplete area where surface sensing of the obstacle has not been completed, on the basis of the surface-sensed area of the obstacle and the obstacle position information, sets a divided area obtained by dividing the incomplete area as waypoints, and sets priorities to the waypoints, and
the route via the waypoints is planned on the basis of the priorities set by the priority setting unit.

<4> The control device according to <3>, in which
the priority setting unit sets the priorities of the waypoints according to an order of passing through the waypoints in a route on which a priority cost is lowest among routes passing through all the waypoints, the priority cost being a cost set on the basis of the priority condition.

<5> The control device according to <4>, in which
the priority condition is a total traveling distance or a total power consumption, and
the priority cost is a cost that is set according to a traveling distance or a cost set according to a power consumption.

<6> The control device according to <4>, in which
the priority setting unit sets the priorities of the waypoints according to an order of passing through the waypoints in a route on which a priority cost is lowest among routes passing through all the waypoints, the priority cost being a cost set on the basis of the priority condition and body movement information.

<7> The control device according to <6>, in which
the body movement information is
information of a maximum speed, a minimum turning radius, and a height of a crossable step on a path in a case where the priority condition is a total traveling distance, or
information of a power consumption per unit distance and a charge capacity of a battery in a case where the priority condition is a total power consumption.

<8> The control device according to <3>, in which
the route planning unit plans the route that passes through all the waypoints on the basis of the priorities and a traveling condition, the priorities being respectively set to the waypoints by the priority setting unit.

<9> The control device according to <3>, in which
the route planning unit calculates, for all routes that pass through all the waypoints, a route cost that is set on the basis of the priorities and a traveling condition, the priorities being respectively set to the waypoints by the priority setting unit, and selects a route on which the route cost is lowest.

<10> The control device according to <9>, in which
the traveling condition includes a condition that the waypoints are passed through in descending order of priorities, a condition that traveling is performed in a shortest time even by ignoring the priorities of the waypoints, or a condition that a waypoint with a higher priority is reached earlier.

<11> The control device according to <10>, in which
in a case where the traveling condition is the condition that a waypoint with a higher priority is reached earlier, the route planning unit sets a product of the priority and a time for reaching the waypoint as the route cost, and selects a route on which the route cost is lowest among all the routes.

<12> The control device according to <1>, in which
the own position estimation unit includes a time-series information own position estimation unit that estimates the own position by using time-series information including sensor information supplied in time series and outputs an estimation result as time-series information own position, and
the surface-sensed area recording unit records the surface-sensed area of the obstacle on the basis of the time-series information own position, the obstacle position information, and the surface sensing possible range of the surface sensing unit.

<13> The control device according to <12>, in which
the time-series information is three-dimensional point cloud information detected by light detection and ranging, laser imaging detection and ranging (LIDAR), and position information, posture, velocity, acceleration, and angular velocity detected by a wheel encoder, and
the obstacle position information generation unit generates, on the basis of the three-dimensional point cloud information, obstacle position information including a relative position and a direction of the obstacle in the surroundings.

<14> The control device according to <12>, in which
the own position estimation unit further includes a current information own position estimation unit that estimates the own position, on the basis of current information including sensor information that outputs a current sensing result, and outputs an estimation result as a current information own position.

<15> The control device according to <14>, in which
the current information is a parallax image imaged by the surface sensing unit including a stereo camera,
the current information own position estimation unit generates a depth image on the basis of a parallax image that is the current information, extracts an image feature amount from the depth image, estimates the own position on the basis of a position associated with the image feature amount, and outputs an estimation result as the current information own position, and the own position estimation unit integrates the time-series information own position and the current information own position and outputs an integrated position as the own position.

<16> The control device according to <15>, further including a position image feature amount storage unit in which the position and the image feature amount are stored in association with each other, in which when integrating the time-series information own position and the current information own position and outputting an integrated position as the own position, the own position estimation unit stores the image feature amount corresponding to the current information own position and the own position in association with each other in the position image feature amount storage unit.

<17> The control device according to any one of <1> to <16>, in which in a case where the own position is in an indefinite state, the surface-sensed area recording unit records the surface-sensed area of the obstacle, on the basis of the own position, the obstacle position information, and the surface sensing possible range of the surface sensing unit.

<18> A control method including:

an own position estimation process that estimates an own position;

an obstacle position information generation process that generates obstacle position information including a position of an obstacle in surroundings;

a surface sensing process that senses a surface of the obstacle;

a surface-sensed area recording process that records a surface-sensed area of the obstacle on the basis of the own position, the obstacle position information, and a surface sensing possible range of the surface sensing process; and a route planning process that plans a route on the basis of the surface-sensed area of the obstacle.

<19> A program that causes a computer to function as:

an own position estimation unit that estimates an own position;

an obstacle position information generation unit that generates obstacle position information including a position of an obstacle in surroundings;

a surface sensing unit that senses a surface of the obstacle;

a surface-sensed area recording unit that records a surface-sensed area of the obstacle on the basis of the own position, the obstacle position information, and a surface sensing possible range of the surface sensing unit; and a route planning unit that plans a route on the basis of the surface-sensed area of the obstacle.

<20> A mobile body including:

an own position estimation unit that estimates an own position;

an obstacle position information generation unit that generates obstacle position information including a position of an obstacle in surroundings;

a surface sensing unit that senses a surface of the obstacle;

a surface-sensed area recording unit that records a surface-sensed area of the obstacle on the basis of the own position, the obstacle position information, and a surface sensing possible range of the surface sensing unit;

a planning unit that plans a route on the basis of the surface-sensed area of the obstacle;

an action plan generation unit that generates an action plan on the basis of the route planned by the planning unit; and a control unit that controls an operation of the mobile body on the basis of the action plan determined by the action plan generation unit.

REFERENCE SIGNS LIST

11 Mobile body
21 Sensor group
21a, 21a-1 to 21a-n Sensor
22 Autonomous traveling control unit
23 Actuator group
23a, 23a-1 to 23a-n Actuator
31 Recognition processing unit
32 Action plan processing unit
33 Action control processing unit
41 Route planning unit
42 Action planning unit
43 Operation planning unit
102 Data obtaining unit
105 Output control unit
106 Output unit
107 Drive system control unit
108 Drive system
110 Autonomous traveling control unit
112 Sensor group
113 Actuator group
121 Recognition processing unit
122 Action plan processing unit
123 Action control processing unit
134 Planning unit
161 Route planning unit
162 Action planning unit
163 Operation planning unit
201 LIDAR
202 Wheel encoder
203 Stereo camera
221 Time-series information own position estimation unit
222 Time-series information DB
223 Current information own position estimation unit
224 Position image feature amount DB
225 Own position estimation result integration unit
241 Obstacle recognition unit
242 Surface-sensed area recording unit
243 Surface-sensed possible range information storage unit
244 Surface-sensed area DB
245 Search mode judgment unit

The invention claimed is:

1. A control device, comprising:
an own position estimation unit configured to estimate a position of a mobile body;
an obstacle position information generation unit configured to generate obstacle position information including a position of an obstacle in surroundings of the mobile body;
a surface sensing unit configured to sense a surface of the obstacle;
a surface-sensed area recording unit configured to record a surface-sensed area of the obstacle based on the position of the mobile body, the obstacle position information, and a surface sensing possible range of the surface sensing unit, wherein the surface of the obstacle within the surface sensing possible range of the surface sensing unit is recorded as the surface-sensed area of the obstacle; and a route planning unit configured to plan a route based on the surface-sensed area of the obstacle, wherein the route planning unit includes a priority setting unit, the priority setting unit is configured to:

set an unsensed area in the surroundings based on the surface-sensed area of the obstacle and the obstacle position information, wherein the unsensed area is an area in the surroundings where surface sensing of the obstacle is not completed;

set a plurality of waypoints obtained based on a division of the unsensed area; and set priorities to the plurality of waypoints, and the route, via the plurality of waypoints, is planned based on the set priorities.

2. The control device according to claim 1, wherein the priority setting unit is further configured to set the priorities of the plurality of waypoints based on an order of passing through the plurality of waypoints in a route on which a priority cost is lowest among a plurality of routes passing through the plurality of waypoints, and the priority cost is based on a priority condition.

3. The control device according to claim 2, wherein the priority condition is one of a total traveling distance or a total power consumption, and the priority cost is based on one of a traveling distance or a power consumption.

4. The control device according to claim 2, wherein the priority cost is based on the priority condition and body movement information.

5. The control device according to claim 4, wherein in a case where the priority condition is a total traveling distance, the body movement information corresponds to information of a maximum speed of the mobile body, a minimum turning radius of the mobile body, and a height of a crossable step on a path of the mobile body, or in a case where the priority condition is a total power consumption, the body movement information corresponds to information of at least one of a power consumption per unit distance of the mobile body or a charge capacity of a battery of the mobile body.

6. The control device according to claim 1, wherein the route planning unit is further configured to plan the route that passes through the plurality of waypoints based on the set priorities and a traveling condition.

7. The control device according to claim 1, wherein the route planning unit is further configured to:

calculate, for each route of a plurality of routes that pass through the plurality of waypoints, a route cost that is set based on the priorities of the plurality of waypoints and a traveling condition; and select a route from the plurality of routes on which the route cost is lowest among the plurality of routes.

8. The control device according to claim 7, wherein the traveling condition includes at least one of a first condition that the plurality of waypoints are passed through in descending order of priorities, a second condition that traveling is performed in a shortest time even by ignoring the priorities of the plurality of waypoints, or a third condition that a specific waypoint of the plurality of waypoints with a higher priority among the priorities of the plurality of waypoints is reached earlier among the plurality of waypoints.

9. The control device according to claim 8, wherein in a case where the traveling condition is the third condition, the route planning unit is further configured to set a product of a priority of the specific waypoint and a time to reach the specific waypoint as the route cost.

10. The control device according to claim 1, wherein the own position estimation unit includes a time-series information own position estimation unit, the time-series information own position estimation unit is configured to:

estimate the position of the mobile body based on time-series information including sensor information supplied in time series; and output an estimation result as time-series information own position, and the surface-sensed area recording unit is further configured to record the surface-sensed area of the obstacle based on the time-series information own position, the obstacle position information, and the surface sensing possible range of the surface sensing unit.

11. The control device according to claim 10, wherein the time-series information comprises:

three-dimensional point cloud information detected by light detection and ranging, laser imaging detection and ranging (LIDAR); and position information of the mobile body, posture of the mobile body, velocity of the mobile body, acceleration of the mobile body, and angular velocity of the mobile body detected by a wheel encoder, the obstacle position information generation unit is further configured to generate the obstacle position information based on the three-dimensional point cloud information, and the obstacle position information includes a relative position of the obstacle and a direction of the obstacle in the surroundings.

12. The control device according to claim 10, wherein the own position estimation unit further includes a current information own position estimation unit that is configured to:

estimate the position of the mobile body based on current information, wherein the current information includes the sensor information that outputs a current sensing result; and output an estimation result as a current information own position.

13. The control device according to claim 12, wherein the current information is a parallax image imaged by the surface sensing unit that includes a stereo camera, the current information own position estimation unit is further configured to:

generate a depth image based on the parallax image that is the current information;

extract an image feature amount from the depth image;

estimate the position of the mobile body based on a position associated with the image feature amount; and output the estimation result as the current information own position, and the own position estimation unit is further configured to:

integrate the time-series information own position and the current information own position; and output an integrated position as the position of the mobile body based on the integration of the time-series information own position and the current information own position.

14. The control device according to claim 13, further comprising
a position image feature amount storage unit configured to store the position of the mobile body with respect to the image feature amount, wherein
the own position estimation unit is further configured to store the image feature amount corresponding to the current information own position in association with the position of the mobile body in the position image feature amount storage unit.

15. The control device according to claim 1, wherein
in a case where the position of the mobile body is in an indefinite state, the surface-sensed area recording unit is further configured to record the surface-sensed area of the obstacle based on position of the mobile body, the obstacle position information, and the surface sensing possible range of the surface sensing unit.

16. A control method, comprising:
estimating a position of a mobile body;
generating obstacle position information including a position of an obstacle in surroundings of the mobile body;
sensing a surface of the obstacle;
recording a surface-sensed area of the obstacle based on the position of the mobile body, the obstacle position information, and a surface sensing possible range of the sensing, wherein
the surface of the obstacle within the surface sensing possible range is recorded as the surface-sensed area of the obstacle;
setting an unsensed area in the surroundings based on the surface-sensed area of the obstacle and the obstacle position information;
wherein the unsensed area is an area in the surroundings where sensing of the obstacle is not completed;
setting a plurality of waypoints obtained by dividing the unsensed area;
setting priorities to the plurality of waypoints; and
planning a route, via the plurality of waypoints, based on the set priorities.

17. A non-transitory computer-readable medium having stored thereon, computer-executable instructions which, when executed by a computer, cause the computer to execute operations, the operations comprising:
estimating a position of a mobile body;
generating obstacle position information including a position of an obstacle in surroundings of the mobile body;
sensing a surface of the obstacle;
recording a surface-sensed area of the obstacle based on the position of the mobile body, the obstacle position information, and a surface sensing possible range of the sensing,
wherein the surface of the obstacle within the surface sensing possible range is recorded as the surface-sensed area;
setting an unsensed area in the surroundings based on the surface-sensed area of the obstacle and the obstacle position information;
wherein the unsensed area is an area in the surroundings where sensing of the obstacle is not completed;
setting a plurality of waypoints obtained by dividing the unsensed area;
setting priorities to the plurality of waypoints; and
planning a route, via the plurality of waypoints, based on the set priorities.

18. A mobile body, comprising:
an own position estimation unit configured to estimate a position of the mobile body;
an obstacle position information generation unit configured to generate an obstacle position information including a position of an obstacle in surroundings of the mobile body;
a surface sensing unit configured to sense a surface of the obstacle;
a surface-sensed area recording unit configured to record a surface-sensed area of the obstacle based on the position of the mobile body, the obstacle position information, and a surface sensing possible range of the surface sensing unit,
wherein the surface of the obstacle within the surface sensing possible range of the surface sensing unit is recorded as the surface-sensed area of the obstacle;
a route planning unit configured to plan a route based on the surface-sensed area of the obstacle, wherein
the route planning unit includes a priority setting unit,
the priority setting unit is configured to:
set an unsensed area in the surroundings based on the surface-sensed area of the obstacle and the obstacle position information, wherein
the unsensed area is an area in the surroundings where surface sensing of the obstacle is not completed;
set a plurality of waypoints obtained based on a division of the unsensed area; and
set priorities to the plurality of waypoints, and
the route, via the plurality of waypoints, is planned based on the set priorities;
an action plan generation unit configured to generate an action plan based on the planned route; and
a control unit configured to control an operation of the mobile body based on the generated action plan.

* * * * *